(12) United States Patent
Miyadera

(10) Patent No.: US 9,881,240 B2
(45) Date of Patent: Jan. 30, 2018

(54) IMAGE PROCESSING DEVICE, SYSTEM, AND METHOD FOR CORRECTING A DITHERING PROCESS

(71) Applicant: Tatsuya Miyadera, Kanagawa (JP)

(72) Inventor: Tatsuya Miyadera, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/413,888

(22) Filed: Jan. 24, 2017

(65) Prior Publication Data

US 2017/0220913 A1  Aug. 3, 2017

(30) Foreign Application Priority Data

Feb. 1, 2016 (JP) .................. 2016-017461

(51) Int. Cl.
*G06K 15/02* (2006.01)
*G03G 15/01* (2006.01)
*H04N 1/29* (2006.01)
*H04N 1/40* (2006.01)
*H04N 1/405* (2006.01)

(52) U.S. Cl.
CPC ......... *G06K 15/1876* (2013.01); *G03G 15/01* (2013.01); *G06K 15/027* (2013.01); *H04N 1/29* (2013.01); *H04N 1/405* (2013.01); *H04N 1/40068* (2013.01)

(58) Field of Classification Search
CPC .... G09G 3/2044; G09G 3/2048; H04N 1/387; H04N 1/3875; H04N 1/393; H04N 1/3935; H04N 1/40068; H04N 19/59; H04N 2201/325; H04N 5/2628; H04N 1/407; H04N 1/4078; H04N 1/6027; G06T 3/4007; G06T 3/40
See application file for complete search history.

(56) References Cited

U.S. PATENT DOCUMENTS

| | | | |
|---|---|---|---|
| 2001/0038712 A1* | 11/2001 | Loce ................ | H04N 1/409 382/190 |
| 2009/0091796 A1* | 4/2009 | Hirota .............. | H04N 1/52 358/3.13 |
| 2013/0207339 A1 | 8/2013 | Yokoyama et al. | |
| 2013/0343775 A1 | 12/2013 | Yamaguchi et al. | |

(Continued)

FOREIGN PATENT DOCUMENTS

| | | |
|---|---|---|
| JP | 2000-239341 | 9/2000 |
| JP | 2013-114091 | 6/2013 |
| JP | 2015-018170 | 1/2015 |

*Primary Examiner* — Henok A Shiferaw
(74) *Attorney, Agent, or Firm* — Harness, Dickey & Pierce

(57) ABSTRACT

An image processing device includes a dithering circuit, a gradation correction pattern generating circuit, and a gradation correction pattern correcting circuit. The dithering circuit performs a dithering process on image data to generate dithered image data. The gradation correction pattern generating circuit sets, in multi-valued data, gradation information of each of pixels of the generated dithered image data, and generates a gradation correction pattern imitating the dithered image data. The gradation correction pattern correcting circuit performs pattern matching on the generated gradation correction pattern, and corrects the generated gradation correction pattern in accordance with a result of the pattern matching.

17 Claims, 24 Drawing Sheets

(56) References Cited

U.S. PATENT DOCUMENTS

| | | |
|---|---|---|
| 2014/0002564 A1 | 1/2014 | Miyadera et al. |
| 2014/0028773 A1 | 1/2014 | Miyadera |
| 2014/0049591 A1 | 2/2014 | Shirasaki et al. |
| 2014/0078521 A1 | 3/2014 | Hayashi et al. |
| 2014/0125752 A1 | 5/2014 | Miyadera et al. |
| 2014/0139885 A1* | 5/2014 | Nakagawa ........... H04N 1/4051 358/3.14 |
| 2014/0146120 A1 | 5/2014 | Miyadera |
| 2014/0146371 A1 | 5/2014 | Hayashi |
| 2014/0152754 A1 | 6/2014 | Murakami |
| 2014/0153010 A1 | 6/2014 | Miyadera et al. |
| 2014/0153042 A1 | 6/2014 | Kawanabe et al. |
| 2014/0153943 A1 | 6/2014 | Miyadera |
| 2014/0204429 A1 | 7/2014 | Miyadera et al. |
| 2015/0015923 A1 | 1/2015 | Hayashi |
| 2015/0042738 A1 | 2/2015 | Miyadera et al. |
| 2015/0139702 A1 | 5/2015 | Murakami et al. |
| 2015/0261117 A1 | 9/2015 | Suzuki et al. |
| 2016/0018774 A1 | 1/2016 | Abe |
| 2016/0077459 A1 | 3/2016 | Miyadera et al. |
| 2016/0077460 A1 | 3/2016 | Miyadera et al. |

* cited by examiner

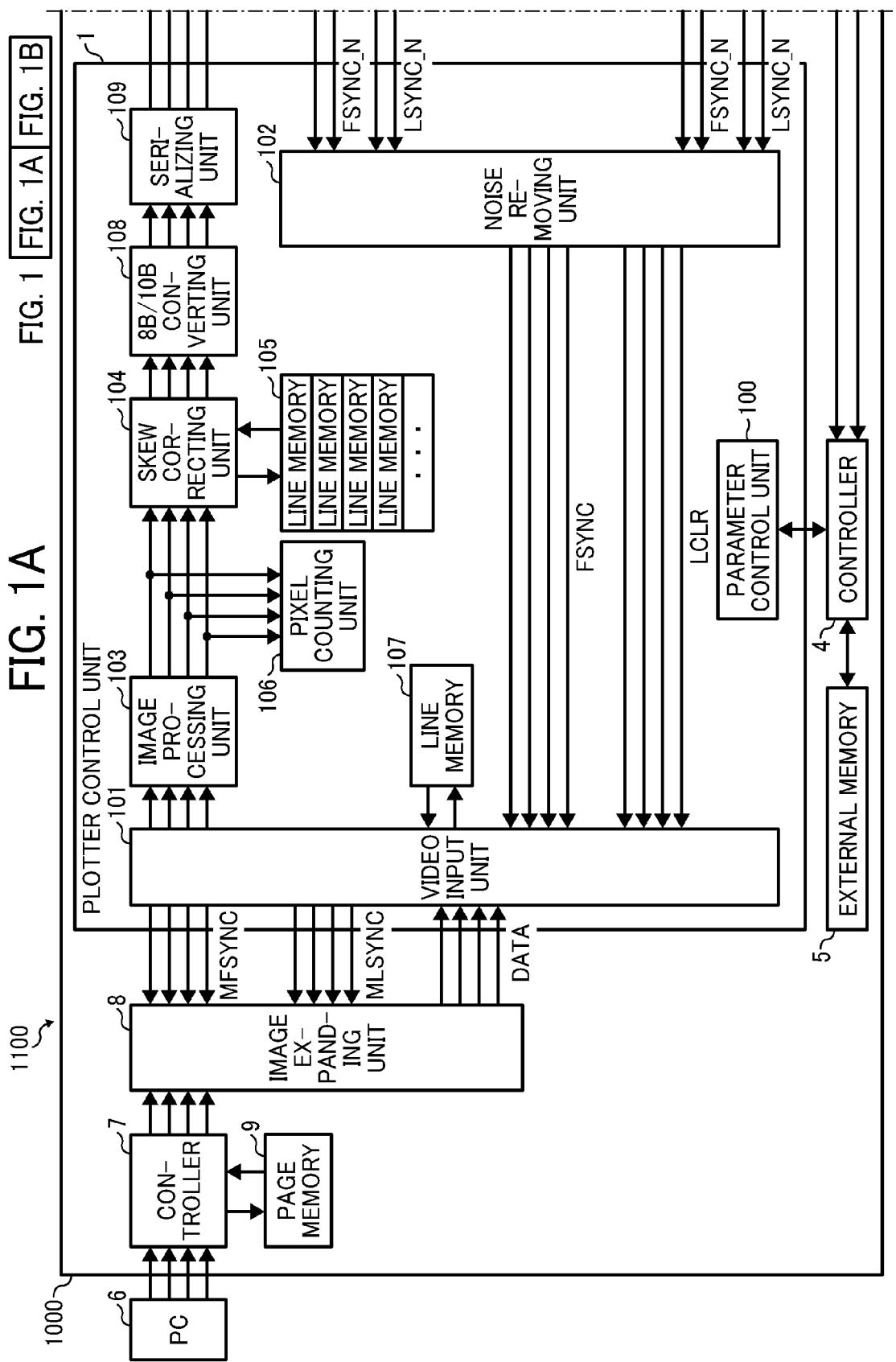

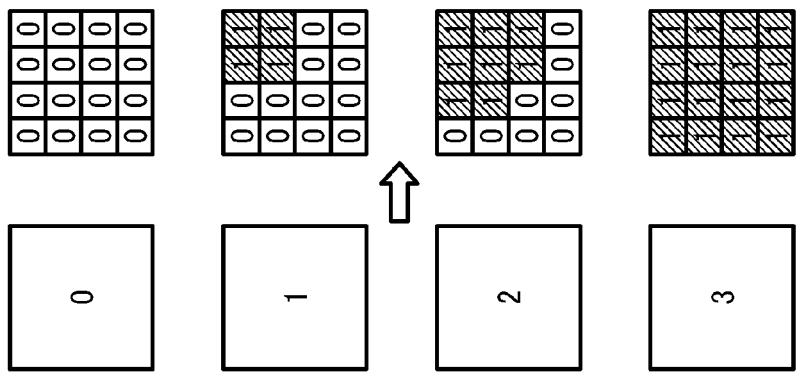
FIG. 2D — BACKWARD SHIFT, UPWARD SHIFT
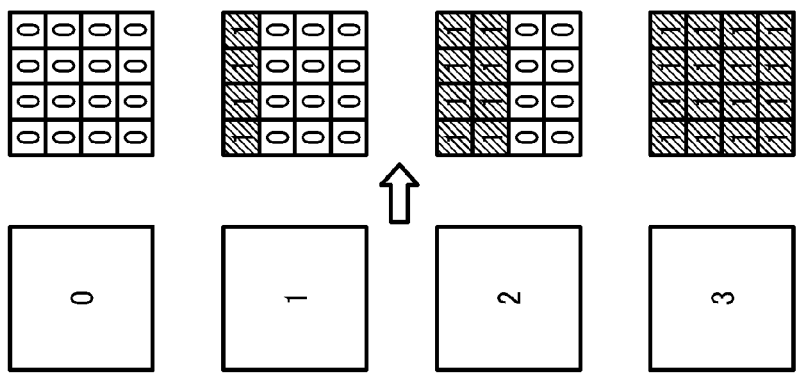
FIG. 2C — NO FORWARD/BACKWARD SHIFT, UPWARD SHIFT (SECOND PATTERN)
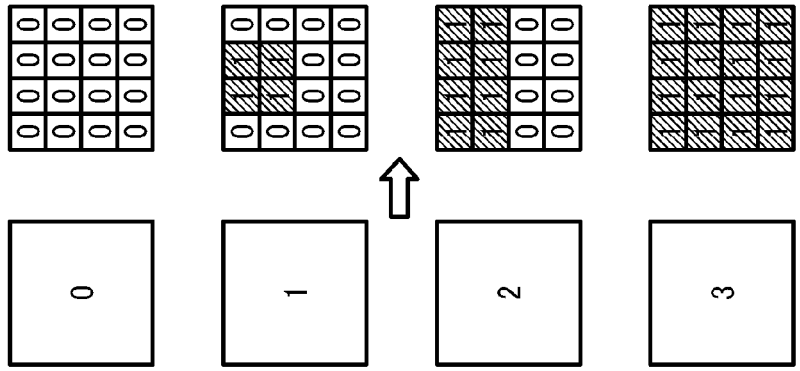
FIG. 2B — NO FORWARD/BACKWARD SHIFT, UPWARD SHIFT (FIRST PATTERN)
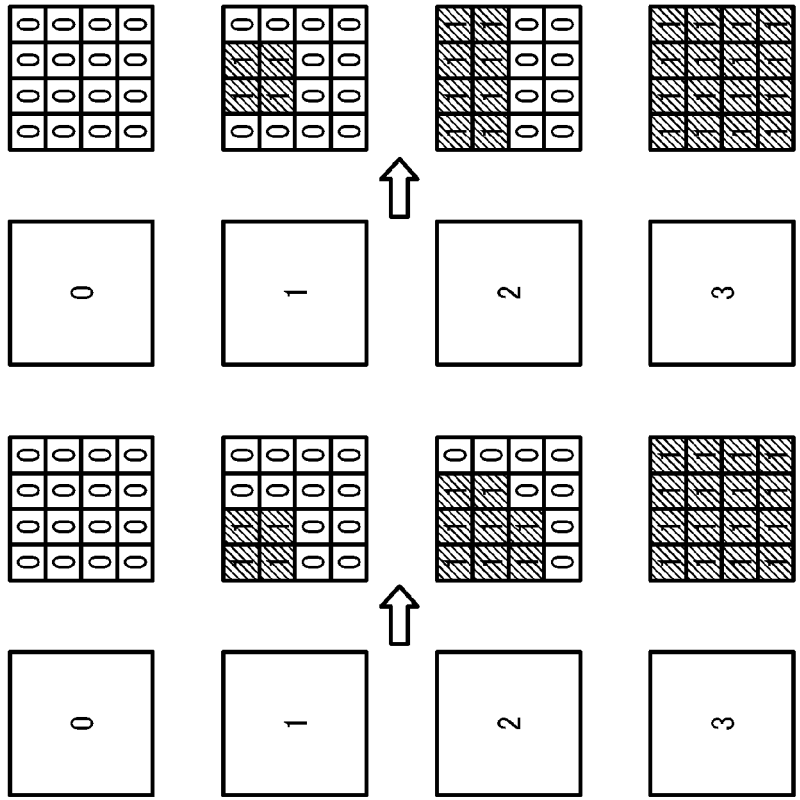
FIG. 2A — FORWARD SHIFT, UPWARD SHIFT

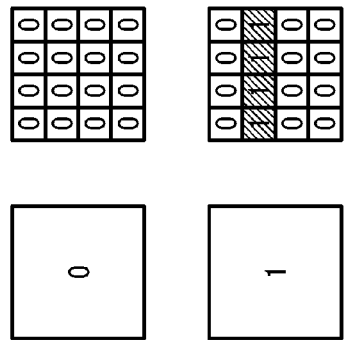
FIG. 3A FORWARD SHIFT, NO UPWARD/DOWNWARD SHIFT (FIRST PATTERN)
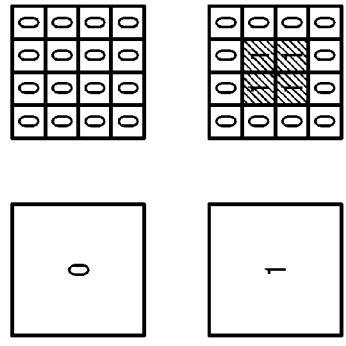
FIG. 3B FORWARD SHIFT, NO UPWARD/DOWNWARD SHIFT (SECOND PATTERN)
FIG. 3C NO FORWARD/BACKWARD SHIFT, NO UPWARD/DOWNWARD SHIFT (FIRST PATTERN)
FIG. 3D NO FORWARD/BACKWARD SHIFT, NO UPWARD/DOWNWARD SHIFT (SECOND PATTERN)

BACKWARD SHIFT, NO UPWARD/DOWNWARD SHIFT (FIRST PATTERN)

BACKWARD SHIFT, NO UPWARD/DOWNWARD SHIFT (SECOND PATTERN)

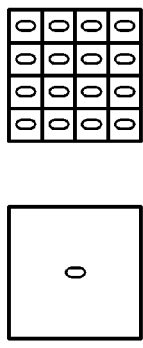
FIG. 4D BACKWARD SHIFT, DOWNWARD SHIFT
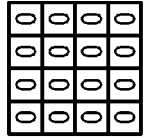
FIG. 4C NO FORWARD/BACKWARD SHIFT, DOWNWARD SHIFT (SECOND PATTERN)
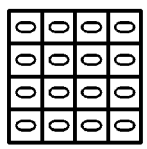
FIG. 4B NO FORWARD/BACKWARD SHIFT, DOWNWARD SHIFT (FIRST PATTERN)
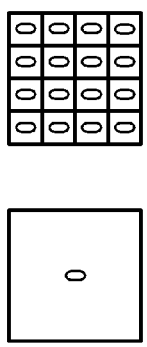
FIG. 4A FORWARD SHIFT, DOWNWARD SHIFT FIG. 5
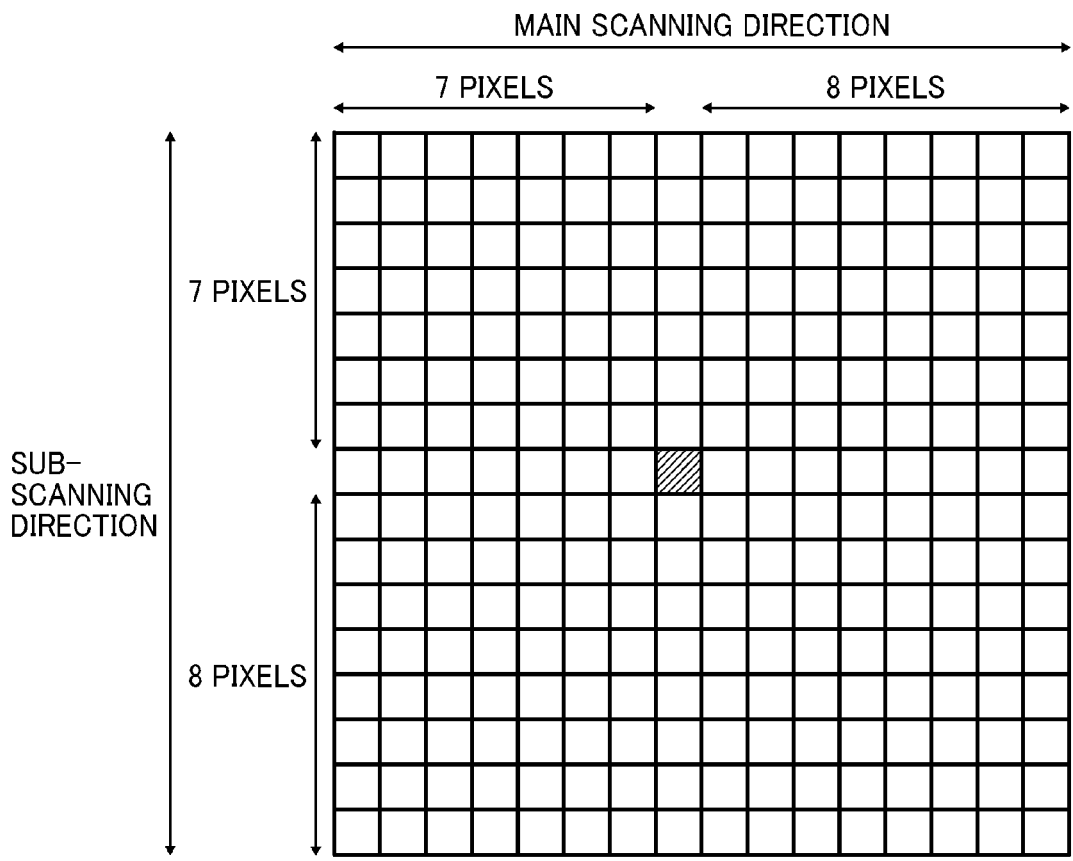
FIG. 6A   FIG. 6B
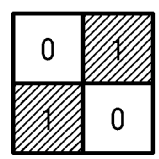   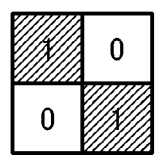
   
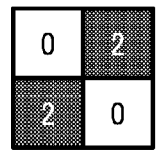   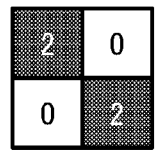

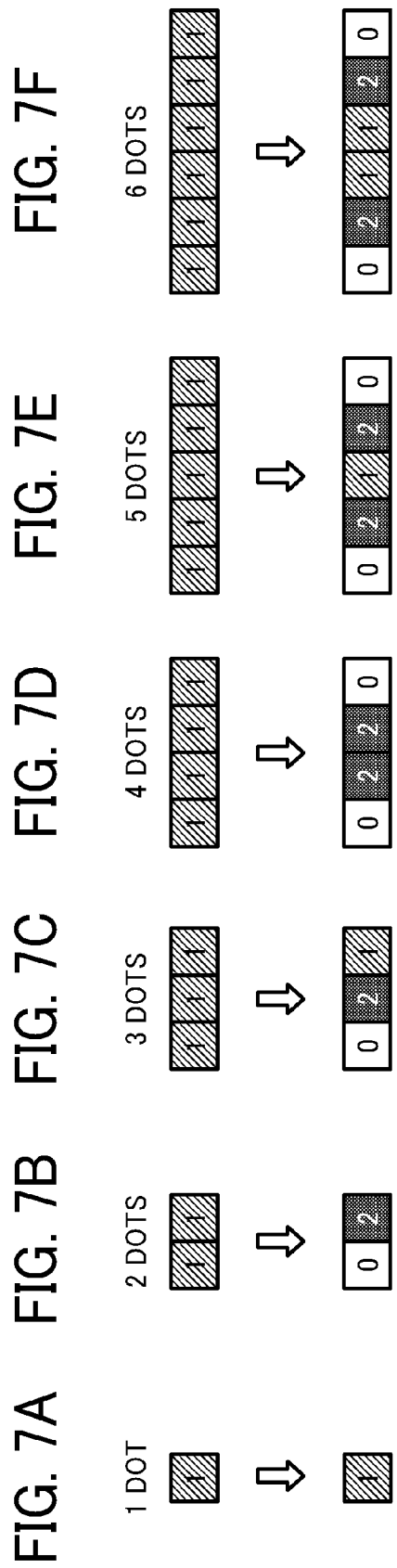

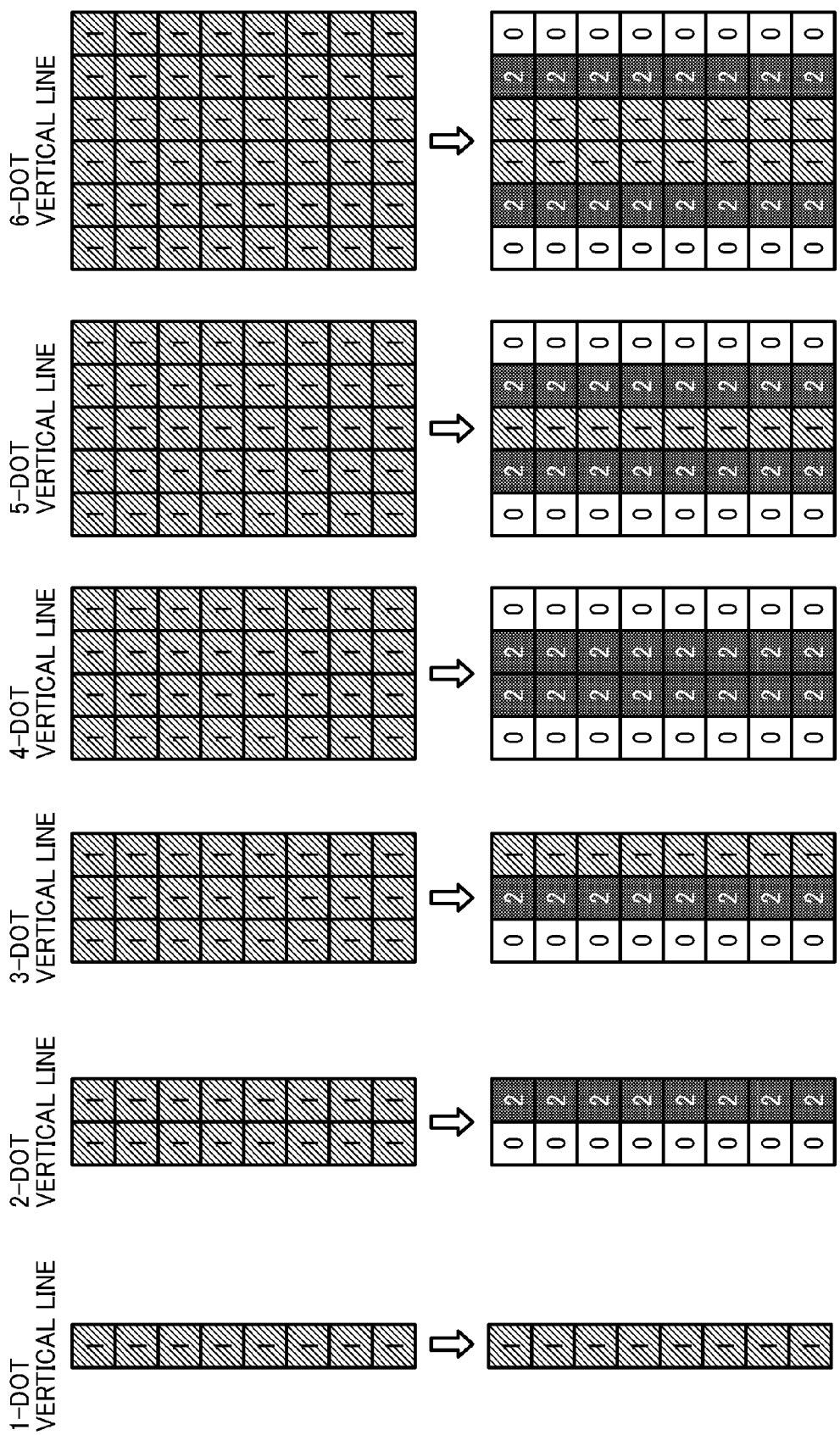

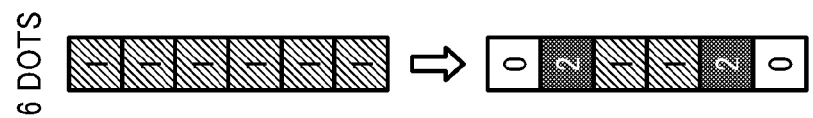
FIG. 9F 6 DOTS
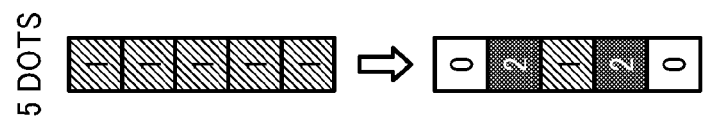
FIG. 9E 5 DOTS
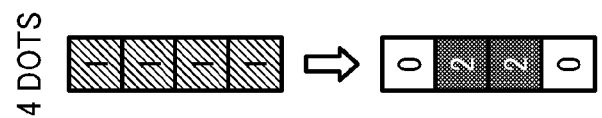
FIG. 9D 4 DOTS
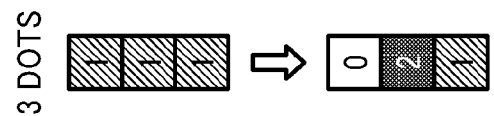
FIG. 9C 3 DOTS
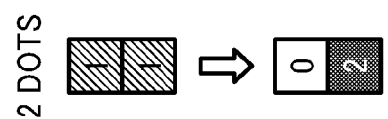
FIG. 9B 2 DOTS
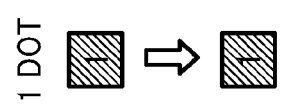
FIG. 9A 1 DOT

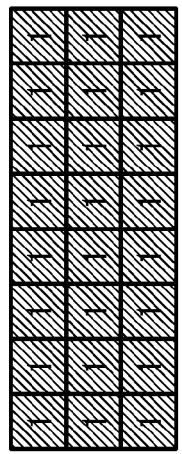
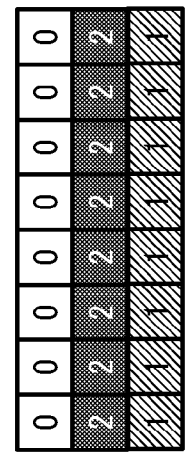
FIG. 10C
3-DOT LATERAL LINE
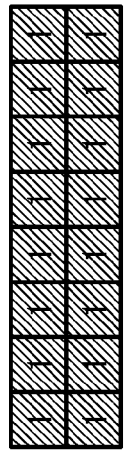
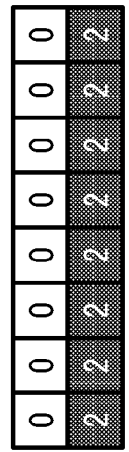
FIG. 10B
2-DOT LATERAL LINE
FIG. 10A
1-DOT LATERAL LINE

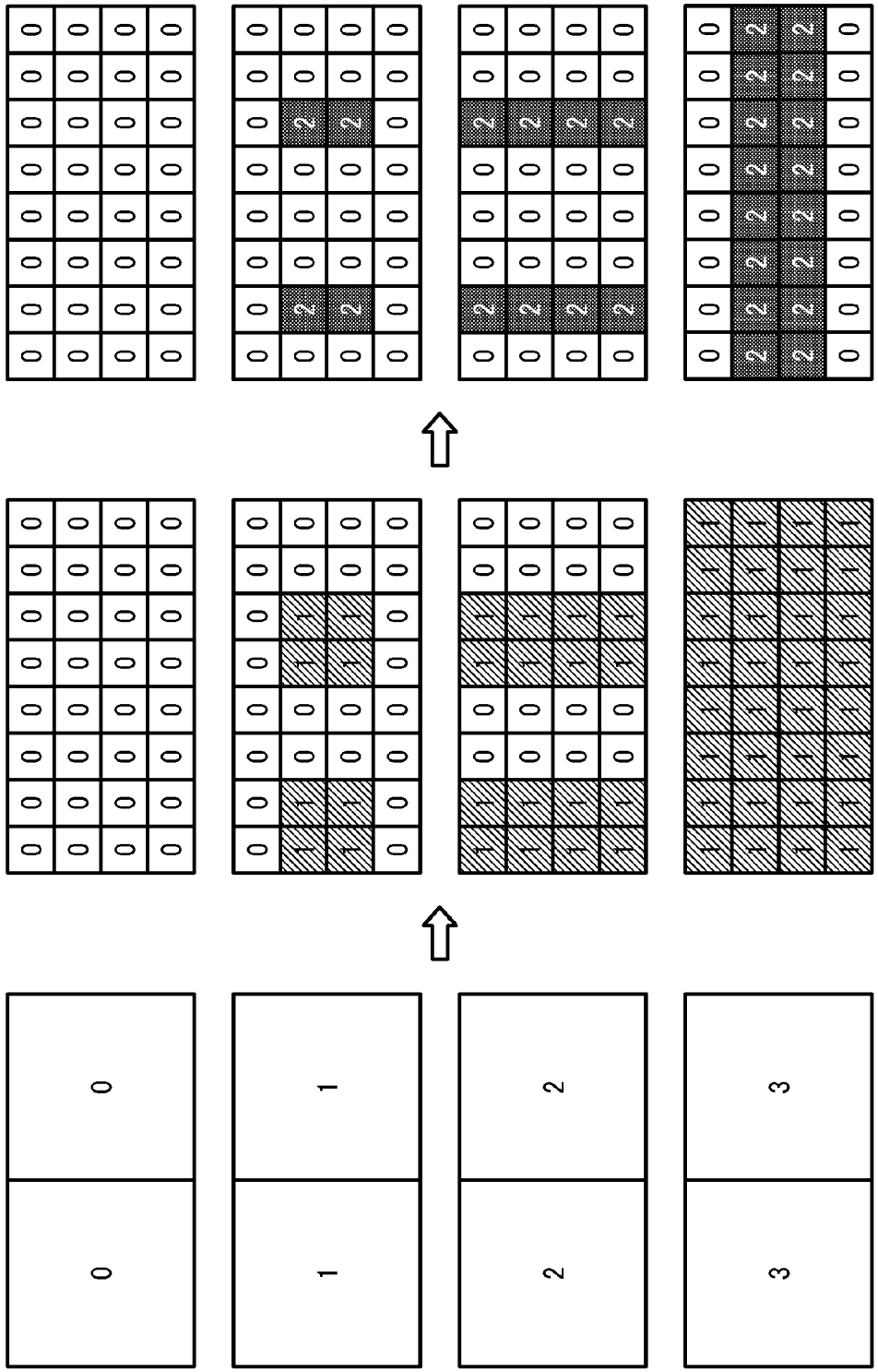

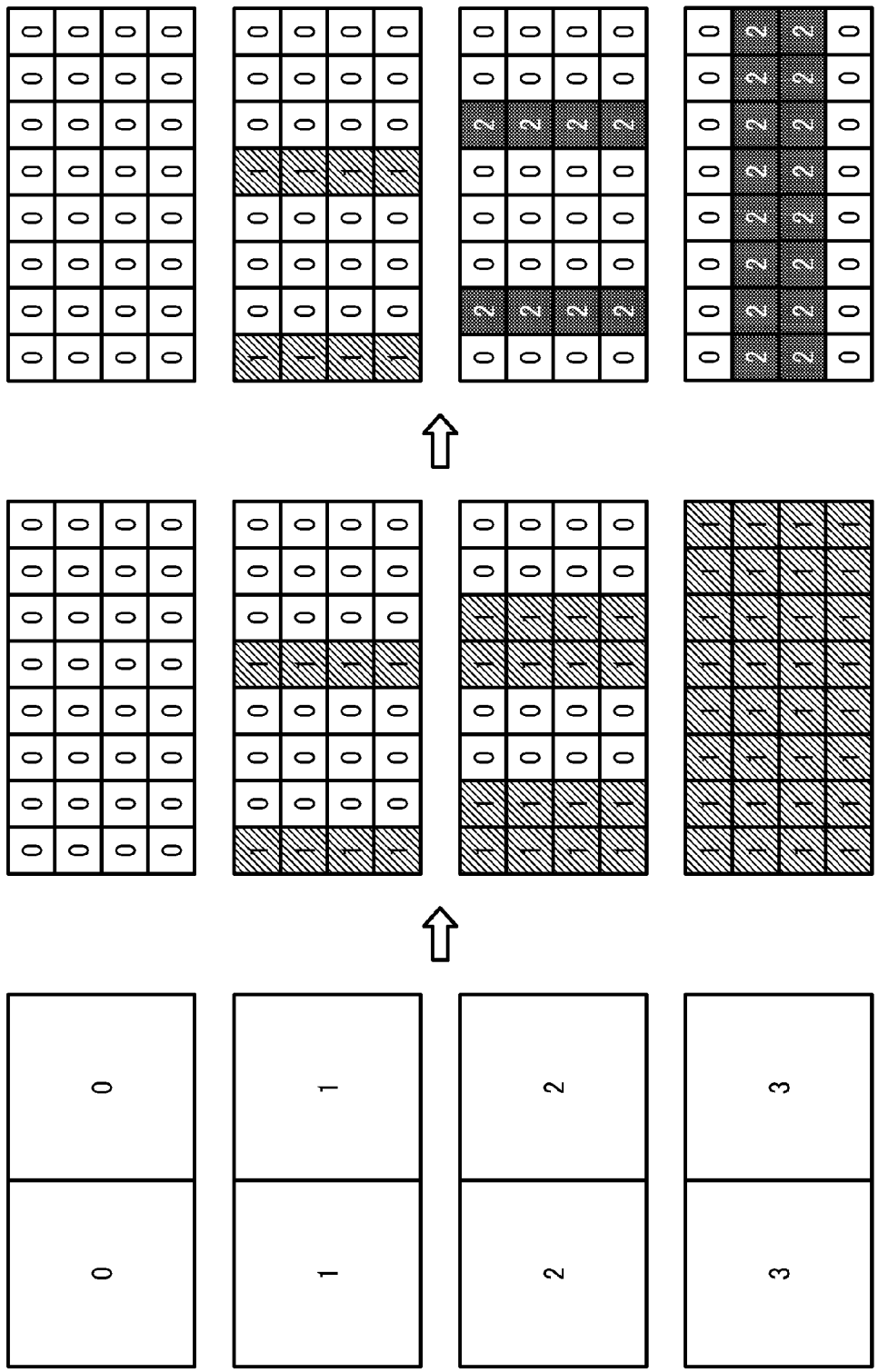

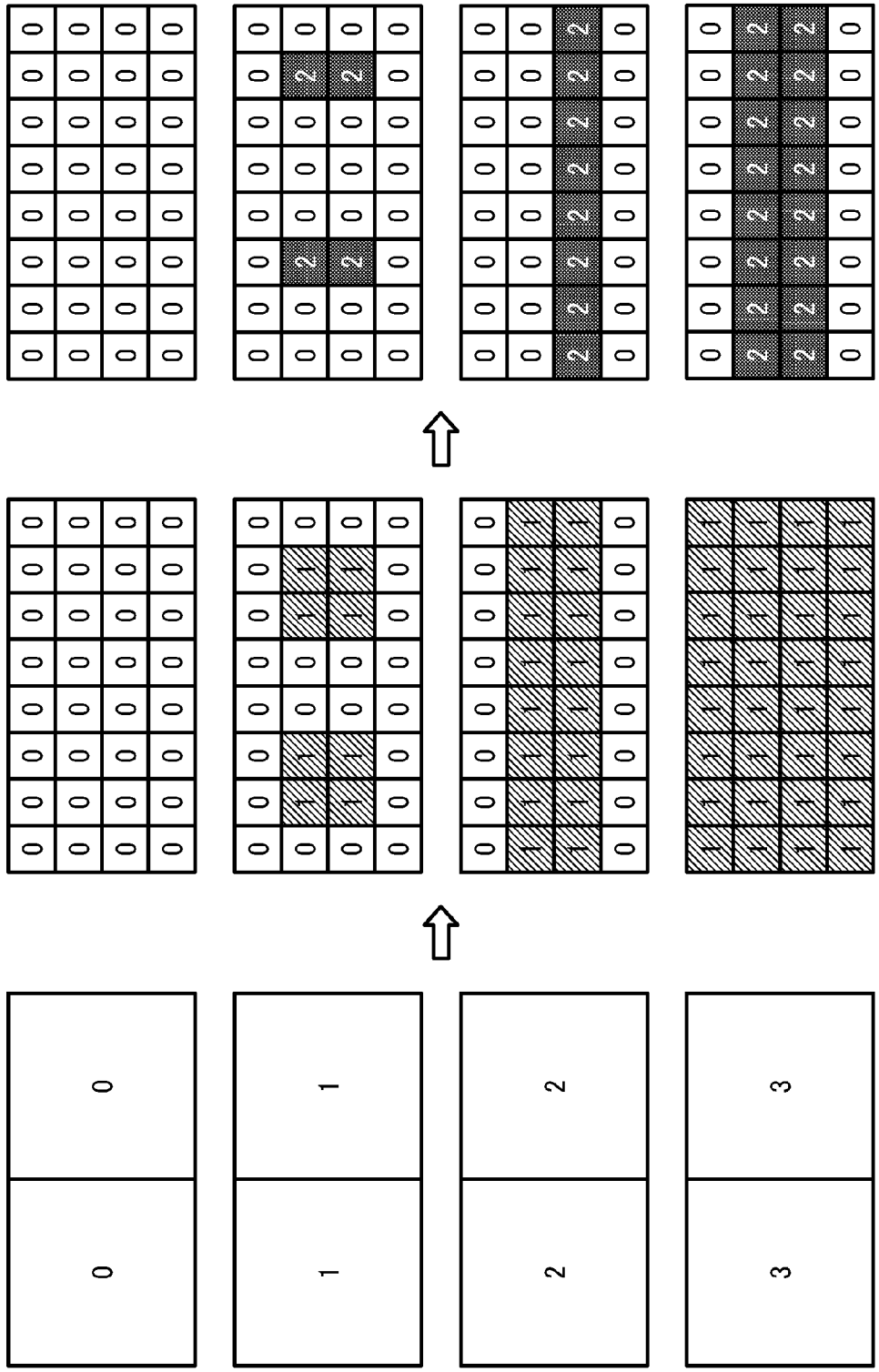

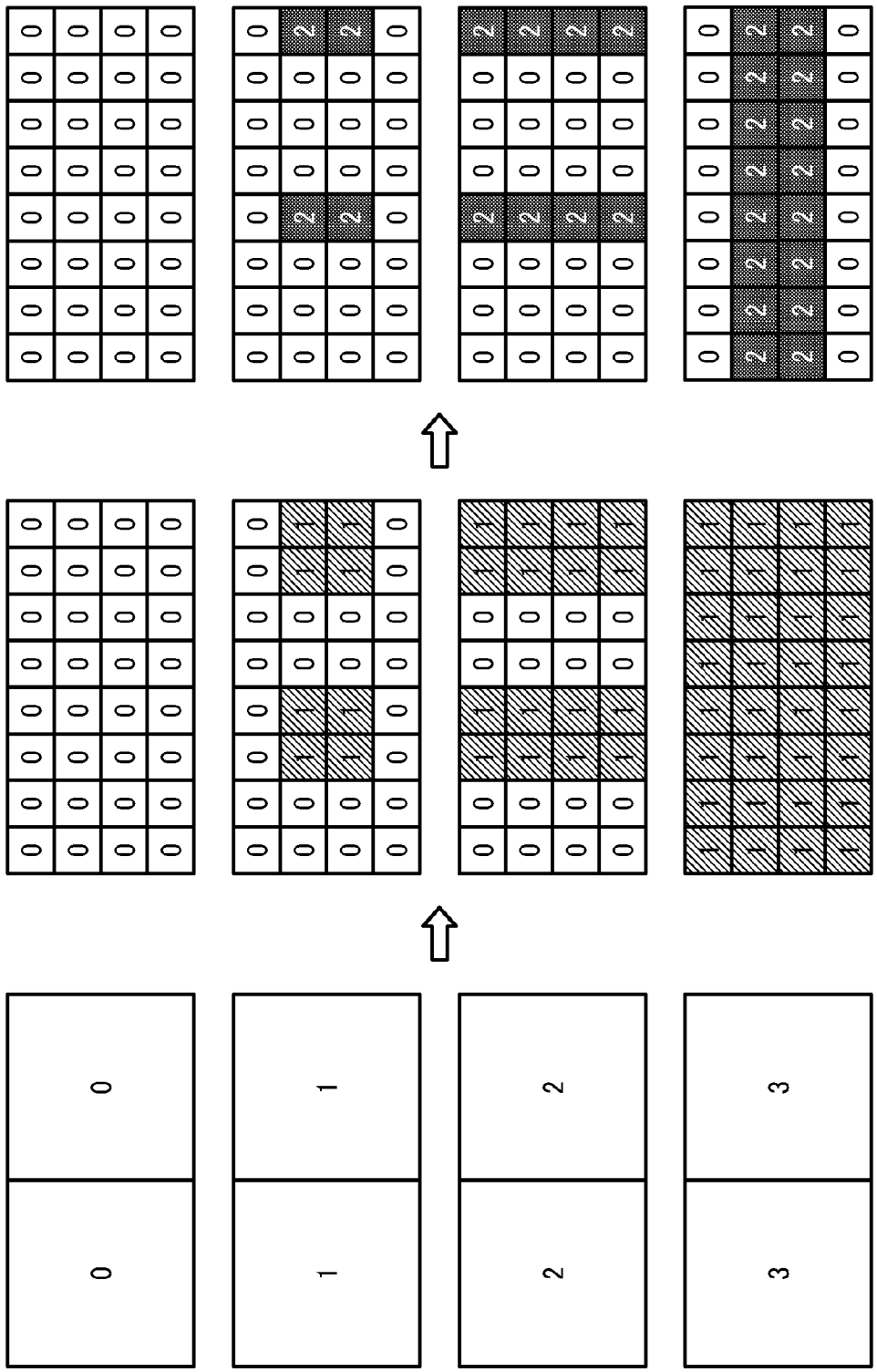

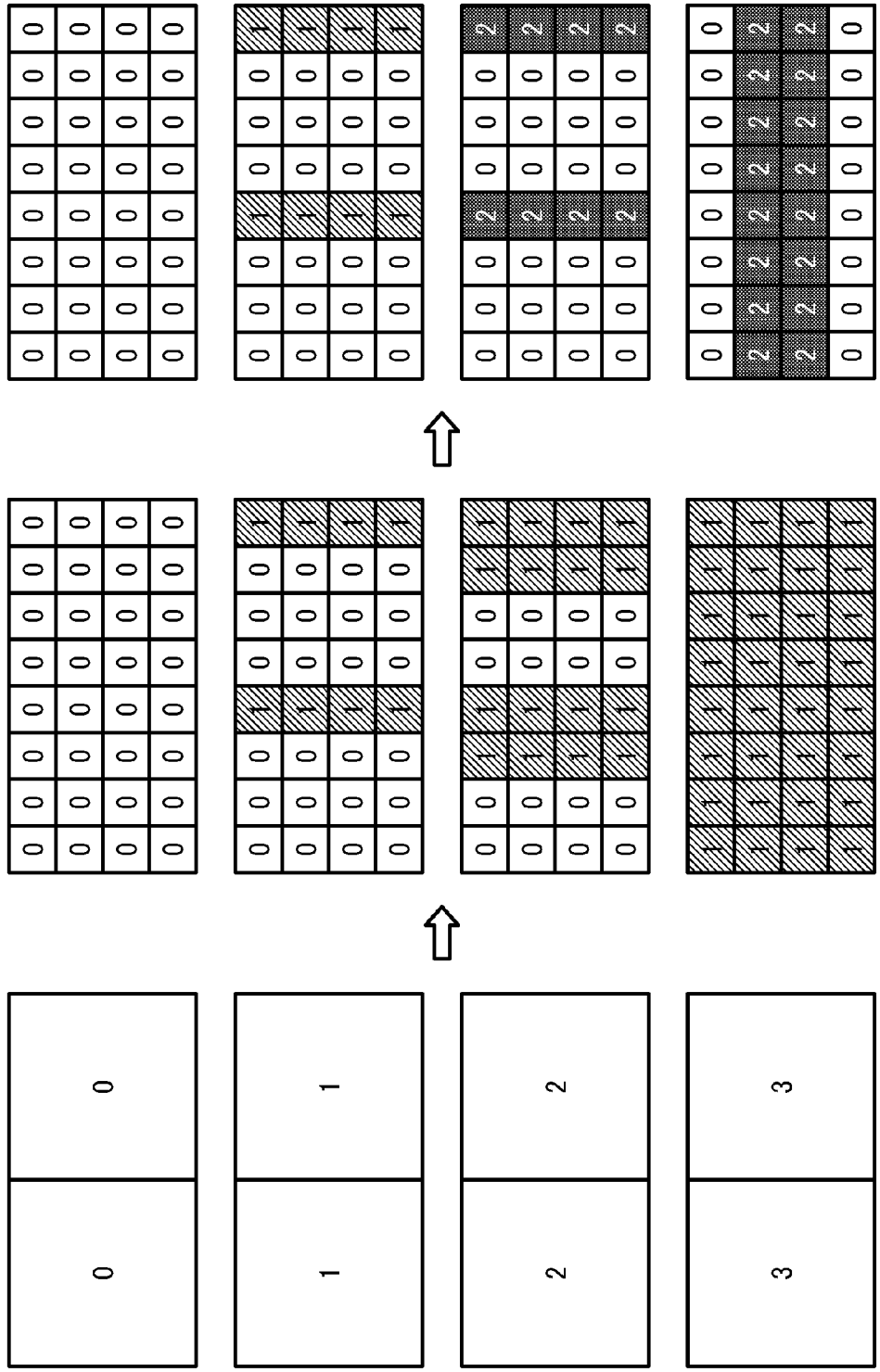

FIG. 17B

| 28 | 29 | 30 | 31 | 32 |
|---|---|---|---|---|
| mask 00_27 [3:0] | mask 00_28 [3:0] | mask 00_29 [3:0] | mask 00_30 [3:0] | mask 00_31 [3:0] |
| mask 01_27 [3:0] | mask 01_28 [3:0] | mask 01_29 [3:0] | mask 01_30 [3:0] | mask 01_31 [3:0] |
| mask 02_27 [3:0] | mask 02_28 [3:0] | mask 02_29 [3:0] | mask 02_30 [3:0] | mask 02_31 [3:0] |
| mask 03_27 [3:0] | mask 03_28 [3:0] | mask 03_29 [3:0] | mask 03_30 [3:0] | mask 03_31 [3:0] |
| mask 04_27 [3:0] | mask 04_28 [3:0] | mask 04_29 [3:0] | mask 04_30 [3:0] | mask 04_31 [3:0] |

⋮

| mask 27_27 [3:0] | mask 27_28 [3:0] | mask 27_29 [3:0] | mask 27_30 [3:0] | mask 27_31 [3:0] |
| mask 28_27 [3:0] | mask 28_28 [3:0] | mask 28_29 [3:0] | mask 28_30 [3:0] | mask 28_31 [3:0] |
| mask 29_27 [3:0] | mask 29_28 [3:0] | mask 29_29 [3:0] | mask 29_30 [3:0] | mask 29_31 [3:0] |
| mask 30_27 [3:0] | mask 30_28 [3:0] | mask 30_29 [3:0] | mask 30_30 [3:0] | mask 30_31 [3:0] |
| mask 31_27 [3:0] | mask 31_28 [3:0] | mask 31_29 [3:0] | mask 31_30 [3:0] | mask 31_31 [3:0] |

600dpi × 600dpi  4bit
1200dpi × 1200dpi  1/2bit
2400dpi × 2400dpi  1bit+tag1bit

IMAGE PROCESSING DEVICE, SYSTEM, AND METHOD FOR CORRECTING A DITHERING PROCESS

CROSS-REFERENCE TO RELATED APPLICATION

This patent application is based on and claims priority pursuant to 35 U.S.C. 119(a) to Japanese Patent Application No. 2016-017461 filed on Feb. 1, 2016, in the Japan Patent Office, the entire disclosure of which is hereby incorporated by reference herein.

BACKGROUND

Technical Field

The present invention relates to an image processing device and an image processing system.

Description of the Related Art

An electrophotographic image forming apparatus may be configured to perform an image density correction method of appropriately controlling the image density by forming a predetermined gradation correction pattern (i.e., an intermediate belt type of inner auto color calibration (IBACC) pattern) on an image bearer such as an intermediate transfer belt, measuring the density of the gradation correction pattern with an optical sensor, calculating density correction data for a dithering process based on the measured density, and correcting the formation of a dithering pattern.

Further, when writing an electrostatic latent image on a photoconductor drum with an optical writing device, the image forming apparatus may perform an exposure method called time-concentration (TC) exposure that intensively exposes a small area with strong light in a minute image in which the beam size is not negligible. Such TC exposure forms a deep, sharp latent image, enhancing the resolution of the latent image.

SUMMARY

In one embodiment of this invention, there is provided an improved image processing device that includes, for example, a dithering circuit, a gradation correction pattern generating circuit, and a gradation correction pattern correcting circuit. The dithering circuit performs a dithering process on image data to generate dithered image data. The gradation correction pattern generating circuit sets, in multi-valued data, gradation information of each of pixels of the generated dithered image data, and generates a gradation correction pattern imitating the dithered image data. The gradation correction pattern correcting circuit performs pattern matching on the generated gradation correction pattern, and corrects the generated gradation correction pattern in accordance with a result of the pattern matching.

In one embodiment of this invention, there is provided an improved image processing system that includes, for example, a dithering processor, a gradation correction pattern generator, and a gradation correction pattern corrector. The dithering processor performs a dithering process on image data to generate dithered image data. The gradation correction pattern generator sets, in multi-valued data, gradation information of each of pixels of the generated dithered image data, and generates a gradation correction pattern imitating the dithered image data. The gradation correction pattern corrector performs pattern matching on the generated gradation correction pattern, and corrects the generated gradation correction pattern in accordance with a result of the pattern matching.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A and 1B are block diagrams schematically illustrating a hardware configuration of an image processing system according to an embodiment of the present invention;

FIGS. 2A to 2D, 3A to 3F, and 4A to 4D are diagrams illustrating a resolution conversion process performed by resolution converting units of the image processing system according to the embodiment;

FIG. 5 is a diagram illustrating a time-concentration exposure process performed by image processing units of the image processing system according to the embodiment;

FIGS. 6A and 6B are diagrams illustrating a diagonal pixel strong exposure process performed by the image processing units of the image processing system according to the embodiment;

FIGS. 7A to 7F, and 8A to 8F are diagrams illustrating a horizontal turning process performed by the image processing units of the image processing system according to the embodiment;

FIGS. 9A to 9F, and 10A to 10F are diagrams illustrating a vertical turning process performed by the image processing units of the image processing system according to the embodiment;

FIGS. 11, 12, 13, 14, 15, and 16 are diagrams illustrating effects of the time-concentration exposure process according to the embodiment;

FIGS. 17A and 17B are diagrams illustrating an IBACC pattern generated by an image processing unit of the image processing system according to the embodiment;

Figure 1B:
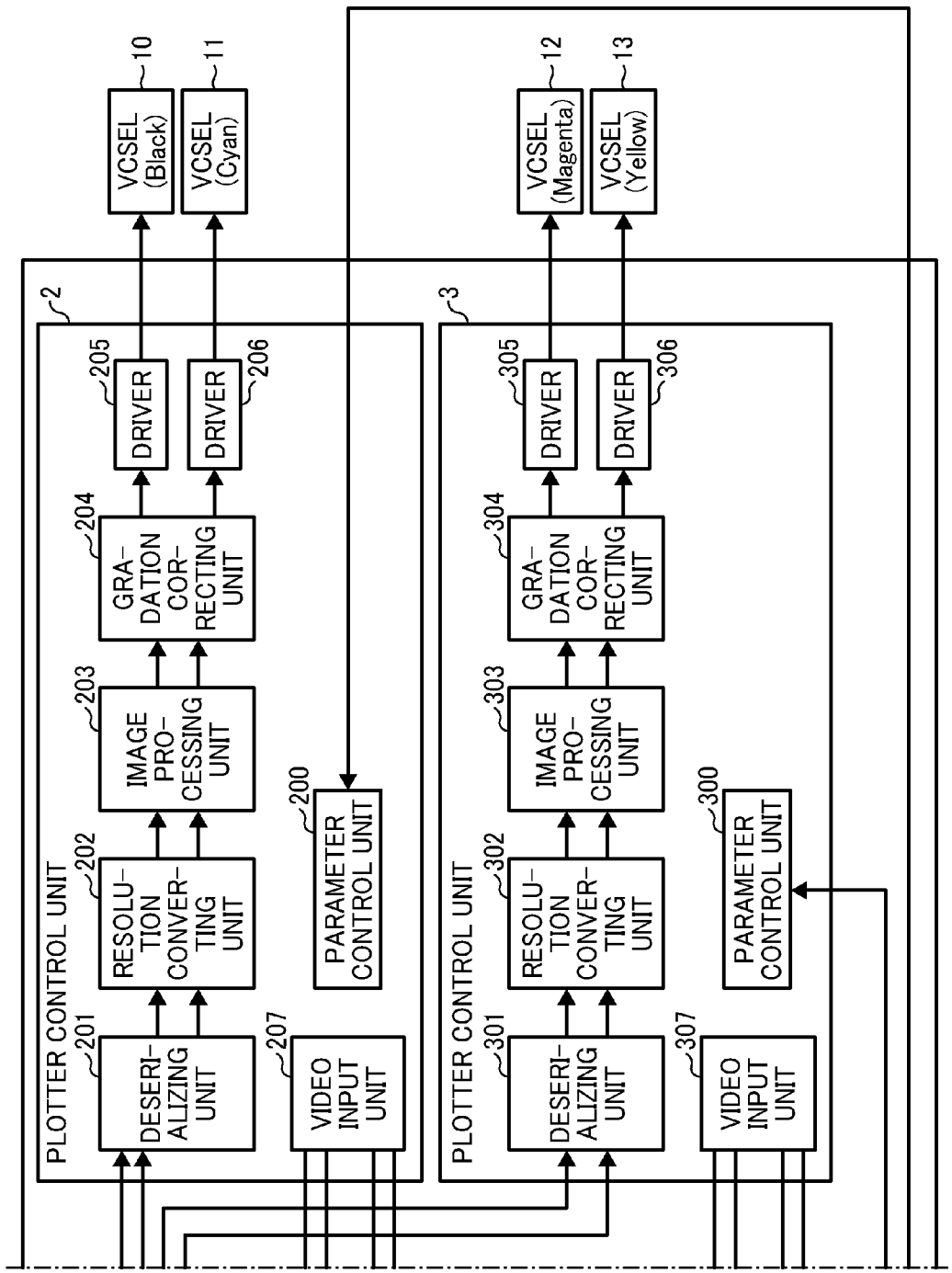
Figure 3E:
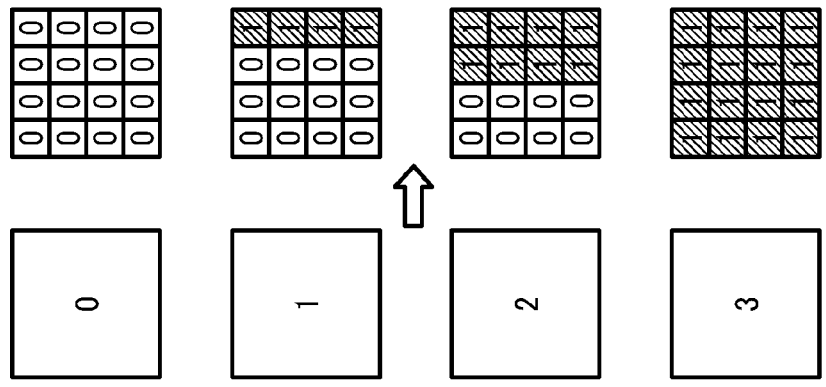
Figure 3F:
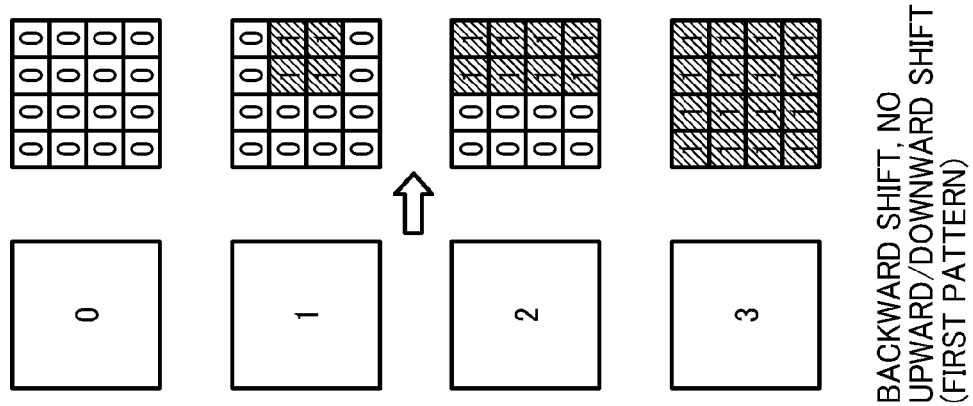
Figure 10F:
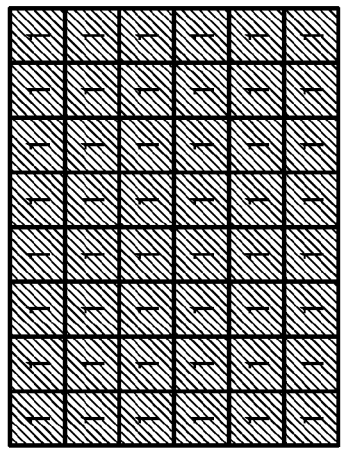
Figure 10E:
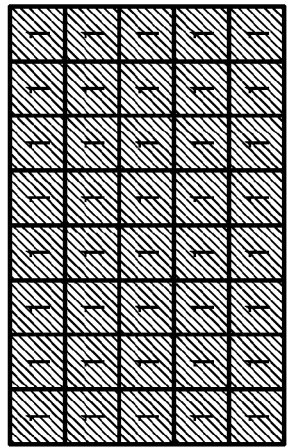
Figure 10D:
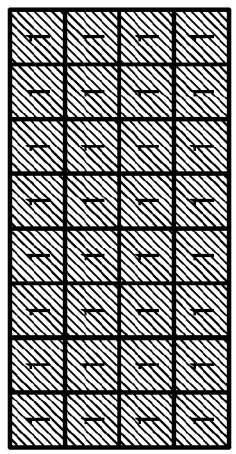
Figure 14:
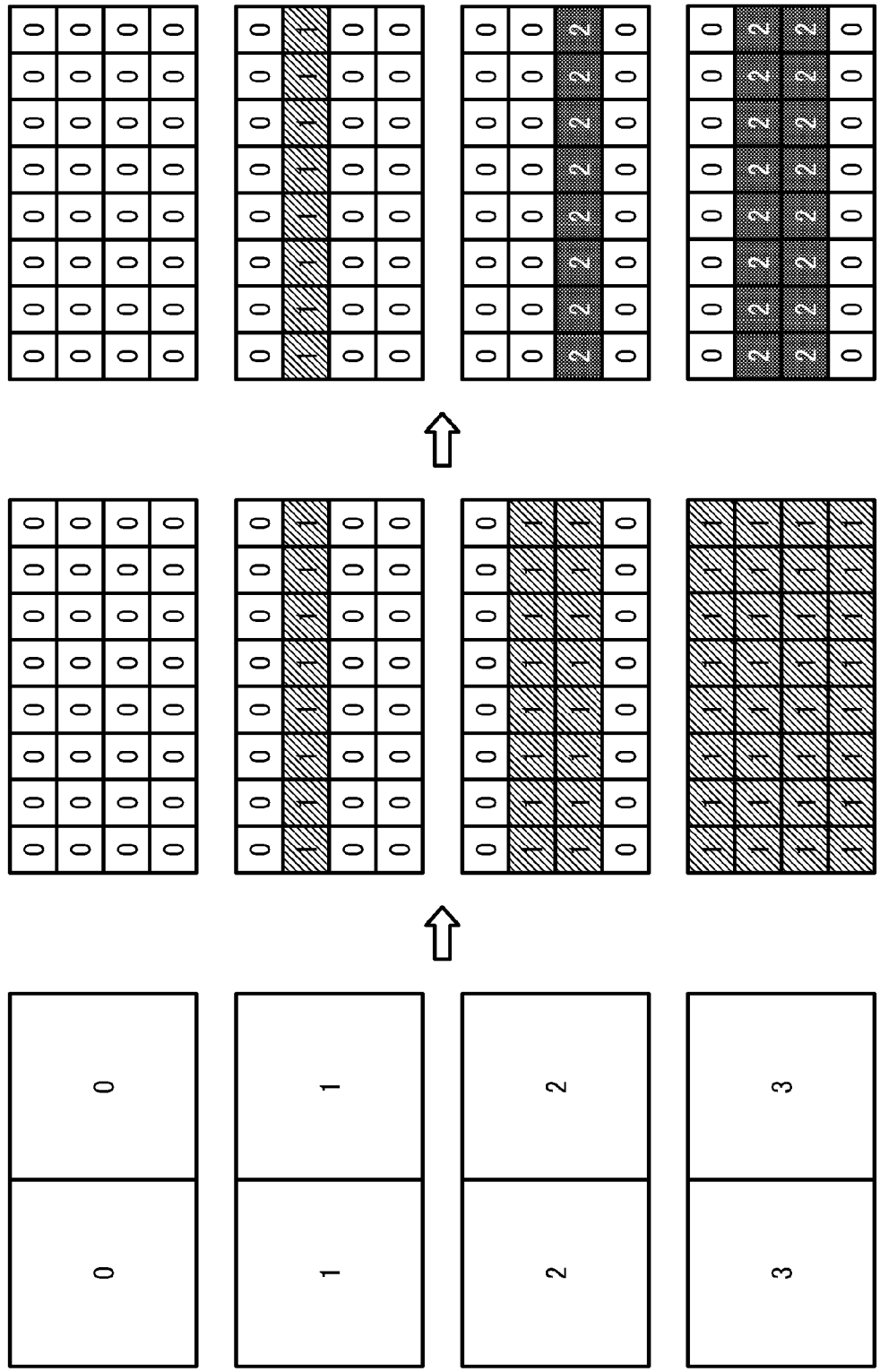

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to an existing image density correction method, a dithering pattern is subjected to time-concentration (TC) exposure that intensively exposes a small area with strong light in a minute image in which the beam size is not negligible. In such an image density correction method, however, the density level of the dithering pattern is simply expressed by a binary zigzag pattern or a binary line pattern serving as a gradation correction pattern, with no consideration of characteristics of a latent image obtained after the TC exposure process performed on the dithering pattern.

According to the above-described image density correction method, therefore, there arises a difference in density between a toner image based on the gradation correction pattern and a toner image based on the dithering pattern of an actual image. This difference in density makes it difficult to accurately calculate density correction data for a dithering process.

Referring now to the accompanying drawings, wherein like reference numerals designate identical or corresponding parts throughout the several views, embodiments of the present invention will be described in detail.

With reference to FIGS. 1A and 1B, a description will first be given of a flow of image data transferred in an image processing system 1100 according to an embodiment of the present invention.

FIGS. 1A and 1B are block diagrams schematically illustrating a hardware configuration of a part of the image processing system 1100 according to the present embodiment. The image processing system 1100 in FIGS. 1A and 1B includes an image processing device 1000, a personal computer (PC) 6, a vertical cavity surface emitting laser (VCSEL) 10 for black, a VCSEL 11 for cyan, a VCSEL 12 for magenta, and a VCSEL 13 for yellow (hereinafter simply referred to as the VCSEL 10, the VCSEL 11, the VCSEL 12, and the VCSEL 13, respectively).

In the present embodiment, the image processing device 1000 includes a plotter control unit 1 for serialized transmission, a plotter control unit 2 for serialized reception, a plotter control unit 3 for serialized reception, a central processing unit (CPU) 4, an external memory 5, a controller 7, an image expanding unit 8, and a page memory 9. The external memory 5 is a detachable memory connected to the CPU 4, and thus may be omitted. Hereinafter, the plotter control unit 1 for serialized transmission, the plotter control unit 2 for serialized reception, and the plotter control unit 3 for serialized reception will be simply referred to as the plotter control unit 1, the plotter control unit 2, and the plotter control unit 3, respectively. FIGS. 1A and 1B mainly illustrate configurations related to the plotter control units 1, 2, and 3. Other configurations related to image formation may be referred to the disclosure of US Patent Application Publication No. 2015/0015923, which is hereby incorporated by reference herein, for example.

In the present example, the plotter control units 1, 2, and 3 transfer image data for printing to the VCSEL 10, the VCSEL 11, the VCSEL 12, and the VCSEL 13, which process a black image, a cyan image, a magenta image, and a yellow image, respectively. Each of the plotter control units 1, 2, and 3 may be implemented by a circuit, such as an application specific integrated circuit (ASIC), or may be partially implemented by a processor, such as a CPU, depending on the function thereof.

The plotter control unit 1, the plotter control unit 2, and the plotter control unit 3 include a parameter control unit 100, a parameter control unit 200, and a parameter control unit 300, respectively, each of which stores parameters for controlling a variety of functional units in the corresponding one of the plotter control units 1, 2, and 3 and transmits the parameters to the functional units. The parameters stored in the parameter control units 100, 200, and 300 are rewritable by the CPU 4.

The parameters are normally stored in a flip-flop (FF) in each of the parameter control units 100, 200, and 300. Alternatively, the parameters may be stored in a memory such as a static random access memory (SRAM) or a first-in, first-out (FIFO) memory. Further, the image processing device 1000 may include the external memory 5 connected to the CPU 4, as illustrated in FIG. 1A, to expand a storage area or optimize the storage area to fit the model of the image processing device 1000.

When the PC 6 issues an instruction to perform a printing operation, image data created by a printer driver of the PC 6 is transferred to the image processing device 1000. The image processing device 1000 transfers the received image data to the controller 7. The controller 7 converts the image data into bitmap data, and transfers the converted image data to the image expanding unit 8 as image data to be actually printed. The controller 7 further performs a dithering process on the image data to generate dithered image data. That is, the controller 7 functions as a dithering circuit (i.e., a dithering processor) in the present embodiment. The controller 7 may be implemented by a circuit, for example. The image expanding unit 8 exchanges signals with a video input unit 101 of the plotter control unit 1, and transfers the image data to the plotter control unit 1.

The video input unit 101 outputs to the image expanding unit 8 a synchronization pulse signal MFSYNC indicating a leading end of a page and a synchronization pulse signal MLSYNC indicating a leading end of a line. The image expanding unit 8 transfers data to the plotter control unit 1 in accordance with the output of the synchronization pulse signal MLSYNC. The plotter control unit 1 transmits and receives image data and signals for all of the four colors.

After the issuance of the print instruction from the PC 6, the CPU 4 checks that the entire image processing device 1000 is ready for the printing operation, and causes a start trigger in the plotter control units 1, 2, and 3. As the start trigger, the CPU 4 supplies a start trigger signal STTRIG to the plotter control units 2 and 3 by using the parameter control units 200 and 300 or an external signal. In video input units 207 and 307 of the plotter control units 2 and 3, the start trigger signal STTRIG generates a start trigger signal STOUT, which serves as a starting point of synchronization signals FSYNC_N and LSYNC_N in the plotter control units 2 and 3.

The synchronization signals FSYNC_N and LSYNC_N are transmitted from the plotter control units 2 and 3 to a noise removing unit 102 of the plotter controlling unit 1 to remove noises due to external environments, such as electrostatic pulses, from the synchronization signals FSYNC_N and LSYNC_N. The synchronization signal FSYNCN_N is transferred to the video input unit 101 of the plotter control unit 1 as a synchronization signal FSYNC, which serves as a starting point of the synchronization signal MFSYNC.

The synchronization signal LSYNC_N starts a thinning process with the synchronization signal FSYNC as a starting point thereof. For each four lines of the synchronization signal LSYNC_N, a signal LCLR is generated as a line period signal for each of the functional units including the video input unit 101. The video input unit 101 generates four lines of the synchronization signal MLSYNC with the signal LCLR as a starting point thereof, and transmits the four lines of the synchronization signal MLSYNC to the image expanding unit 8.

The video input unit 101 of the plotter control unit 1 operates with the same operation clock signal as an operation clock signal for the image expanding unit 8. Data transmitted for each of the lines of the synchronization signal MLSYNC is written line by line to the page memory 9 by the image expanding unit 8. After having written to the page memory 9 four lines of data corresponding to the four lines of the synchronization signal MLSYNC, the image expanding unit 8 performs an operation of reading four lines of data at one time based on the signal LCLR.

Thereafter, the video input unit 101 performs processes such as the addition of an internal pattern to the image data and image processing using a line memory, such as jaggy correction using a line memory 107. The jaggy correction is performed with a sufficient number of memories. To perform the jaggy correction, therefore, the line memory 107 may be increased in number.

An image processing unit 103 generates patterns different from the internal pattern added by the video input unit 101, such as a test pattern and a forgery preventing pattern to be superimposed on the image transferred from the controller 7 and three types of adjustment patterns generated singly by the plotter control unit 1: a density adjustment pattern, a color shift correction pattern, and a blade turn-up prevention pattern that is based on exposure of the entirety of a surface of a photoconductor. The image processing unit 103 further performs image processing such as trimming.

A skew correcting unit 104 stores image-processed data in a plurality of line memories 105 for skew correction, and performs a skew correction process on the stored data while reading the data from the line memories 105 by switching between the line memories 105 in accordance with the read position in the image. The skew correcting unit 104 may use different frequencies obtained by frequency conversion between data reading from the line memories 105 for skew correction and data writing to the line memories 105.

A pixel counting unit 106 measures the amount of image-processed data. The pixel counting unit 106 of the present embodiment is capable of counting the pixels of the test pattern or the forgery prevention pattern to be superimposed on the transferred image and the pixels of each of the adjustment patterns generated singly by the plotter control unit 1. Therefore, pixel information well reflecting the toner consumption amount is obtained. In the case of writing with a laser diode (LD), the toner consumption amount per pixel is changed by gradation conversion. In this case, therefore, pseudo-gradation conversion may be performed on data input to the pixel counting unit 106.

As described above, the plotter control unit 1 adopts multiple data paths such that each of operations from the operation of the video input unit 101 to the writing operation of the skew correcting unit 104 is performed on four lines of signal at one time. The multiple data paths allow the plotter control unit 1 to easily perform resolution conversion, area gradation correction, and density conversion (e.g., density multiplication) in the main scanning direction and the sub-scanning direction. The multiple data paths further allow the plotter control unit 1 to refer to two-dimensional data by a few pixels in the main scanning direction and by a few pixels in the sub-scanning direction at the same time, thereby improving the accuracy of image processing such as an edge processing and the jaggy correction.

The multiple data paths further increase the image transfer rate, thereby allowing the plotter control unit 1 to perform high-speed printing, transfer of an image with a high resolution such as 2400 dots per inch (dpi) or 4800 dpi, and superimposition of a high-resolution pattern on the image data, for example, To multiply the density in the sub-scanning direction, the number of transmissions of the synchronization signal MLSYNC is reduced, and once-written data is read multiple times. For example, to double the density in the sub-scanning direction, two lines of the synchronization signal MLSYNC are transmitted to the image expanding unit 8 for each four lines of the synchronization signal LSYNC_N.

In the skew correction, the line period after the data reading is set to be 1/N (N is a natural number) of the line period in the data writing, and the data is read the N times from one line memory. Thereby, the skew-corrected data has a high density, with the resolution in the sub-scanning direction of the skew-corrected data increased to be the N times higher than that of the data written to the line memory. That is, in the skew correction, the data is subjected to a density multiplication process.

The data subjected to the skew correction and the density multiplication process is transferred to the plotter control units 2 and 3. Since the data is transferred at a substantially high rate, the data is first subjected to 8-bit (8B) to 10-bit (10B) conversion by an 8B/10B converting unit 108 and then to parallel-serial conversion by a serializing unit 109. Thereafter, the data is transmitted to the plotter control units 2 and 3 by low voltage differential signaling (LVDS).

In the plotter control units 2 and 3, deserializing units 201 and 301 respectively receive LVDS signals and convert the LVDS signals back to 8B data. The data thus converted back to the 8B data is then subjected to resolution conversion by resolution converting units 202 and 302 of the plotter control units 2 and 3, i.e., data format conversion in accordance with the light emission resolution of light sources. It is assumed that the present embodiment employs VCSELs to form an optical system that emits light to form electrostatic latent images on an image bearer. That is, in the present embodiment, each of the VCSELs 10, 11, 12, and 13 functions as a light emission circuit. The VCSELs 10, 11, 12, and 13 have a substantially high light emission resolution of 2400 dpi in the main scanning direction×4800 dpi in the sub-scanning direction.

If the input data is low-resolution, multi-valued data, such as 600 dpi×600 dpi, 4-bit data, simply performing the density multiplication process on this input data produces a coarse image. The resolution converting units 202 and 302 therefore expand each of the pixels of the data to a preset value with a lookup table (LUT). That is, the resolution converting units 202 and 302 perform LUT conversion on the pixels. Herein, two types of LUTs, i.e., a LUT for 600 dpi input data and a LUT for 1200 dpi input data, are prepared. Input data having a high resolution, such as 2400 dpi data, is subjected not to the LUT conversion but to a simple density multiplication process.

The data subjected to the resolution conversion is then subjected to image processing by image processing units 203 and 303, which is similar to the image processing performed in the plotter control unit 1. In particular, the image processing units 203 and 303 perform the TC exposure process on the data as image processing for increasing the resolution of the data, to thereby enhance the image quality. That is, in the present embodiment, each of the image processing units 203 and 303 functions as a gradation correction pattern correcting circuit (i.e., a gradation correction pattern corrector). The TC exposure process will be described later with reference to FIGS. 5 to 16.

The image-processed data is then subjected to a γ conversion process by gradation correcting units 204 and 304, to thereby form light emission data optimized for the VCSELs 10, 11, 12, and 13. That is, in the present embodiment, each of the gradation correcting units 204 and 304 functions as a light emission data generating circuit. The light emission data is transferred to drivers 205, 206, 305, and 306 for driving the optical system and used to form the electrostatic latent images on the image bearer such as a photoconductor drum.

According to the thus-configured image processing system 1100, the image processing device 1000 performs the TC exposure process on the dithering pattern of the actual image, and performs image density correction with a gradation correction pattern (i.e., an intermediate belt type of inner auto color calibration (IBACC) pattern). More specifically, the image processing device 1000 perform the IC exposure process a gradation correction pattern including halftone data is generated. Thereby, a latent image similar in quality to the dithering pattern of the actual image is formed and detected, which allows calculation of accurate density correction data for the dithering process.

That is, the above-configured image processing system 1100 performs the TC exposure process after generating the gradation correction pattern including the halftone data, and forms the gradation correction pattern in accordance with the size and variations of pattern matching of the TC exposure process. The image processing system 1100 of the present embodiment therefore forms a toner image similar in quality to the dithering pattern of the actual image.

The resolution conversion process performed by the resolution converting units 202 and 302 of the present embodiment will be described with reference to FIGS. 2A to 4D.

FIGS. 2A to 4D are diagrams illustrating the resolution conversion process performed by the resolution converting units 202 and 302 of the present embodiment. The resolution converting units 202 and 302 convert the resolution of the data into a resolution of at least 2400 dpi in the main scanning direction×4800 dpi in the sub-scanning direction in accordance with the light emission resolution of the VCSELs 10, 11, 12, and 13. The plotter control units 2 and 3 of the present embodiment perform the TC exposure process on the resolution-converted data, without directly transmitting the resolution-converted data to the VCSELs 10, 11, 12, and 13.

In the TC exposure process, the image processing is performed at a resolution of 4800 dpi×4800 dpi, as described later with reference to FIG. 5. Therefore, the resolution converting units 202 and 302 convert the resolution of the input data into the resolution of 4800 dpi×4800 dpi.

As described above, if the input data is low-resolution, multi-valued data, such as 600 dpi×600 dpi, 4-bit data, simply performing the density multiplication process on such input data produces a coarse image. Therefore, the resolution converting units 202 and 302 perform the LUT conversion on the pixels of the input data by expanding each of the pixels of the input data to a preset value with the LUT (i.e., the LUT for 600 dpi input data or the LUT for 1200 dpi input data). Input data having a high resolution, such as 2400 dpi data, on the other hand, is not subjected to the LUT conversion, but is subjected to a simple density multiplication process.

Resolution conversion performed on 1200 dpi, 2-bit input data will be described with reference to FIGS. 2A to 4D.

In FIGS. 2A to 4D, the 1200 dpi, 2-bit input data is subjected to the resolution conversion to be converted into 4800 dpi, 1-bit data, in which each rectangle with value 0 represents an OFF pixel, and each rectangle with value 1 represents an ON pixel. Further, in FIGS. 2A to 4D, the horizontal direction corresponds to the main scanning direction, and the vertical direction corresponds to the sub-scanning direction.

Herein, 2-bit data has four values 0, 1, 2, and 3, and each of the pixels of the data is expanded to 4×4=16 pixels through the resolution conversion. Therefore, halftone data corresponding to input data of value 1 and input data of value 2 has a plurality of conversion patterns.

That is, the resolution conversion converts input data of value 0 into pixels that are all white, and converts input data of value 3 into pixels that are all black. As for the halftone data, there are 14 conversion patterns in accordance with combinations of forward shift, no forward or backward shift, and backward shift in the main scanning direction, and upward shift, no upward or downward shift, and downward shift in the sub-scanning direction.

Which one of the conversion patterns is to be used in the resolution conversion is determined with reference to the LUT. The LUT may be automatically selected in accordance with the type of the input image, or may be set as a parameter by the CPU 4.

The TC exposure process performed by the image processing units 203 and 303 of the present embodiment will be described with reference to FIG. 5.

FIG. 5 is a diagram illustrating the TC exposure process performed by the image processing units 203 and 303 of the present embodiment. The TC exposure refers to an exposure method of intensively exposing a small area with strong light. The TC exposure forms a deep, sharp latent image of a minute image in which the beam size is not negligible, while maintaining the density of the image. Therefore, the TC exposure enhances the resolution of the latent image and reduces weak electrolyte areas, thereby improving the image stability. Further, the TC exposure stabilizes thin character lines, and reduces the cost per page (CPP). The TC exposure process is performed during the period of forming the actual image (i.e., the image output from the controller 7), and is not performed in the other periods.

The TC exposure process is performed based on a pattern matching process using an image matrix. Specifically, the TC exposure process is performed with an image matrix of 16 dots in the main scanning direction×16 dots in the sub-scanning direction at a resolution of 4800 dpi×4800 dpi.

The pattern matching is performed on a target pixel to convert the halftone data. In FIG. 5, the target pixel is a hatched pixel corresponding to eighth dot in the main scanning direction and the eighth dot in the sub-scanning direction. The pattern matching includes three types: a diagonal pixel strong exposure process, a horizontal turning process, and a vertical turning process.

In the diagonal pixel strong exposure process, strong exposure is performed on a pixel diagonal to the target pixel (i.e., a pixel on the upper-left, lower-left, upper-right, or lower-right of the target pixel) with reference to a reference matrix of 3 dots×3 dots including the target pixel. The diagonal pixel strong exposure process will be described later with reference to FIGS. 6A and 6B.

In the horizontal turning process, horizontal pattern matching is performed on 16 dots×1 dot on the eighth dot in the main scanning direction with reference to a reference matrix of 16 dots×1 dot including the target pixel. Data matching a predetermined pattern in the pattern matching is replaced by preset pattern data. The horizontal turning process will be described later with reference to FIGS. 7A to 8F.

In the vertical turning process, vertical pattern matching is performed on 1 dot×16 dots on the eighth dot in the sub-scanning direction with reference to a reference matrix of 1 dot×16 dots including the target pixel. Data matching a predetermined pattern in the pattern matching is replaced by preset pattern data. The vertical turning process will be described later with reference to FIGS. 9A to 10F.

As described above, the TC exposure process includes the three types of pattern matching: the diagonal pixel strong exposure process, the horizontal turning process, and the vertical turning process, each of which is set with priority. The diagonal pixel strong exposure process is set with first priority, the horizontal turning process is set with second priority, and the vertical turning process is set with third priority. In the TC exposure process, plural types of pattern matching are not performed on the target pixel. After a process of the highest priority is performed on the target pixel in accordance with the result of the pattern matching, the IC exposure process on the target pixel is completed.

When the pattern matching is performed in the TC exposure, tag information (i.e., data for identifying the type of the pixel, such as character, line, character dither, line dither, or photo dither) attached to the pixel information may be detected and referred to to select one of the plural types of pattern matching in the IC exposure.

Herein, a tag bit is transferred as an extension bit of normal pixel information. When the tag bit is attached to 2400 dpi×2400 dpi, 1-bit data, the data to be transferred is configured to have 2 bits per pixel, with the tag bit as the most significant bit (MSB) and a pixel bit as the least significant bit (LSB).

If it is difficult to transfer the tag bit owing to a low data transfer rate, the tag bit may be forcefully attached to the data in the plotter control units 2 and 3. In this case, the tag is fixed to one entire page, and thus the accuracy of the TC exposure process is reduced in an image in which different types of components such as dithers, characters, and lines are mixed. However, the TC exposure process is accurately performed on a page in which dithered photo image data items are uniformly arranged or a page in which character or line data items are uniformly arranged.

In the TC exposure process, the tag information and the pixel value of the target pixel are referred to determine whether the target pixel is a white character, a white line, a black character, a black line, or a dither, and a different pattern matching process is performed in accordance with the determination. The TC exposure forms an image by intensively exposing a small area with strong light. In the case of the black character or the black line, therefore, a pattern matching process for converting a thick light line into a fine dark line is performed.

In the case of the white character or the white line, a pattern matching process for converting a fine line into a thick line is performed. In the case of the dither, the data is replaced by the pattern data to have a preset density. If the process for the character or line is given priority, or if the data fails to be identified as the dithering pattern owing to the lack of the tag information, no particular process is performed on the data. In the TC exposure, the light intensity may be individually set for each of the process for the black character or the black line, the process for the white character or the white line, and the process for the dither with reference to the tag information.

The diagonal pixel strong exposure process performed by the image processing units 203 and 303 of the present embodiment will be described with reference to FIGS. 6A and 6B.

FIGS. 6A and 6B are diagrams illustrating the diagonal pixel strong exposure process performed by the image processing units 203 and 303 of the present embodiment. In FIGS. 6A and 6B, the horizontal direction corresponds to the main scanning direction, and the vertical direction corresponds to the sub-scanning direction. Further, each rectangle with value 0 represents an OFF pixel, each rectangle with value 1 represents an ON pixel, and each rectangle with value 2 represents a strong exposure pixel (i.e., a pixel set for strong exposure). The same applies to later-described FIGS. 7A and 16.

As illustrated in FIGS. 6A and 6B, if there is a sequence of ON pixels aligned in a diagonal direction, the diagonal pixel strong exposure process converts the target pixel and a pixel diagonal to the target pixel (i.e., a pixel on the upper-left, lower-left, upper-right, and lower-right of the target pixel) into strong exposure pixels.

The strong exposure pixel is exposed with higher light emission energy than light emission energy set for a regular pixel, with the pixel size and the lighting time of the strong exposure pixel unchanged. Consequently, the diagonal pixel strong exposure process forms a deep, sharp latent image of a diagonal line, enhancing the resolution of the latent image and reducing weak electrolyte areas, thereby improving the image stability.

The horizontal turning process performed by the image processing units 203 and 303 of the present embodiment will be described with reference to FIGS. 7A to 8F.

FIGS. 7A to 8F are diagrams illustrating the horizontal turning process performed by the image processing units 203 and 303 of the present embodiment. Although FIGS. 7A to 8F illustrate pixels corresponding to the first to sixth dots, the horizontal turning process is similarly performed on pixels corresponding to the seventh and subsequent dots.

As illustrated in FIGS. 7A to 7D, the horizontal turning process converts (i.e., turns) an edge portion of a sequence of ON pixels aligned in the main scanning direction into a strong exposure pixel. The strong exposure pixel is exposed with higher light emission energy than the light emission energy set for the regular pixel, with the pixel size and the lighting time of the strong exposure pixel unchanged. Further, in the horizontal turning process, the above-described conversion process is repeated in the sub-scanning direction, as illustrated in FIGS. 8A to 8F. Consequently, a deep, sharp latent image of a straight line in the sub-scanning direction is formed, enhancing the resolution of the latent image and reducing weak electrolyte areas, thereby improving the image stability.

For example, as illustrated in FIG. 8B, if the data matches a 4800 dpi, 2-column pattern, the pixels on the right side are set to be strong exposure pixels, and the pixels on the left side are set to be OFF pixels. Thereby, the data is converted into a 1-column pattern of strong exposure pixels.

As described above, if an edge portion of a sequence of ON pixels in the main scanning direction is detected as a result of the pattern matching, the target pixel is converted into a strong exposure pixel, and a pixel adjacent to the target pixel is converted into an OFF pixel. Thereby, a deep, sharp latent image is formed.

The vertical turning process performed by the image processing units 203 and 303 of the present embodiment will be described with reference to FIGS. 9A to 10F.

FIGS. 9A to 10F are diagrams illustrating the vertical turning process performed by the image processing units 203 and 303 of the present embodiment. Although FIGS. 9A to 10F illustrate pixels corresponding to the first to sixth dots, the vertical turning process is similarly performed on pixels corresponding to the seventh and subsequent dots.

As illustrated in FIGS. 9A to 9F, the vertical turning process converts (i.e., turns) an edge portion of a sequence of ON pixels aligned in the sub-scanning direction into a strong exposure pixel. The strong exposure pixel is exposed with higher light emission energy than the light emission energy set for the regular pixel, with the pixel size and the lighting time of the strong exposure pixel unchanged. Further, in the vertical turning process, the above-described conversion process is repeated in the main scanning direction, as illustrated in FIGS. 10A to 10F. Consequently, a deep, sharp latent image of a straight line in the main scanning direction is formed, enhancing the resolution of the latent image and reducing weak electrolyte areas, thereby improving the image stability.

For example, as illustrated in FIG. 10B, if the data matches a 4800 dpi, 2-row pattern, the pixels on the lower side are set to be strong exposure pixels, and the pixels on the upper side are set to be OFF pixels. Thereby, the data is converted into a 1-row pattern of strong exposure pixels.

As described above, if an edge portion of a sequence of ON pixels in the sub-scanning direction is detected as a result of the pattern matching, the target pixel is converted into a strong exposure pixel, and a pixel adjacent to the target pixel is converted into an OFF pixel. Thereby, a deep, sharp latent image is formed.

Effects of the TC exposure process of the present embodiment will be described with reference to FIGS. 11 to 16.

FIGS. 11 to 16 are diagrams illustrating effects of the TC exposure process of the present embodiment. With reference to FIGS. 11 to 16, effects of the TC exposure process will be described with reference to an example of two aligned pixels of the 1200 dpi, 2-bit input data in six conversion patterns out of the foregoing 14 conversion patterns, i.e., six conversion patterns according to combinations of forward shift, no forward or backward shift, and backward shift in the main scanning direction and no upward or downward shift in the sub-scanning direction. In each of FIGS. 11 to 16, 1200 dpi, 2-bit input data, 4800 dpi, 1-bit data subjected to the resolution conversion, and data subjected to the TC exposure process are illustrated from the left side to the right side of the drawing.

In the case of input data of value 0, all pixels remain to be OFF pixels. In the case of input data of value 3, the ON pixels are recognized as forming a 4-dot lateral line. Thus, the vertical turning process is performed to convert the 4-dot lateral line into a 2-dot lateral line formed of strong exposure pixels. The result of this conversion depends on an adjacent pixel. That is, if an edge portion of the pixel corresponding to the input data of value 3 is adjacent to a white pixel, the edge portion is changed into strong exposure pixels.

In the case of input data of value 1, the ON pixels form squares of 2 dots×2 dots in a first pattern of forward shift in FIG. 11, a first pattern of no forward or backward shift in FIG. 13, and a first pattern of backward shift in FIG. 15. In these patterns, therefore, the squares of 2 dots×2 dots change into columns of 1 dot×2 dots formed of strong exposure pixels. In the case of the input data of value 1, the result of the conversion depends on an adjacent pixel in the first pattern of forward shift in FIG. 11 and the first pattern of backward shift in FIG. 15. In the first pattern of no forward or backward shift in FIG. 13, on the other hand, the ON pixels are isolated from any adjacent pixel, and thus the conversion causes a constant change, unaffected by the adjacent pixel. In a second pattern of forward shift in FIG. 12, a second pattern of no forward or backward shift in FIG. 14, and a second pattern of backward shift in FIG. 16, the ON pixels form columns of 1 dot×4 dots or rows of 4 dots×1 dot, and are not changed.

In the case of input data of value 2, the ON pixels form columns of 2 dots×4 dots in forward shift in FIGS. 11 and 12 and backward shift in FIGS. 15 and 16. Thus, the columns of 2 dots×4 dots change into columns of 1 dot×4 dots formed of strong exposure pixels. In the case of the input data of value 2, the result of the conversion depends on an adjacent pixel. Further, in no forward or backward shift in FIGS. 13 and 14, the ON pixels form rows of 4 dots×2 dots. Thus, the rows of 4 dots×2 dots change into rows of 4 dots×1 dot formed of strong exposure pixels. In this case, the ON pixels are isolated from an adjacent pixel in the sub-scanning direction, and thus the conversion causes a constant change, unaffected by the adjacent pixel.

As described above, the TC exposure process performed on the halftone data causes differences in the shape of light-emitting pixels subjected to the TC exposure process, depending on the pattern of resolution conversion. In expressing halftone with the dithering pattern, therefore, it is desirable to design the image in consideration of the TC exposure process.

The IBACC pattern generated by the image processing unit 103 of the present embodiment will be described with reference to FIGS. 17A and 17B.

Figure 17A:
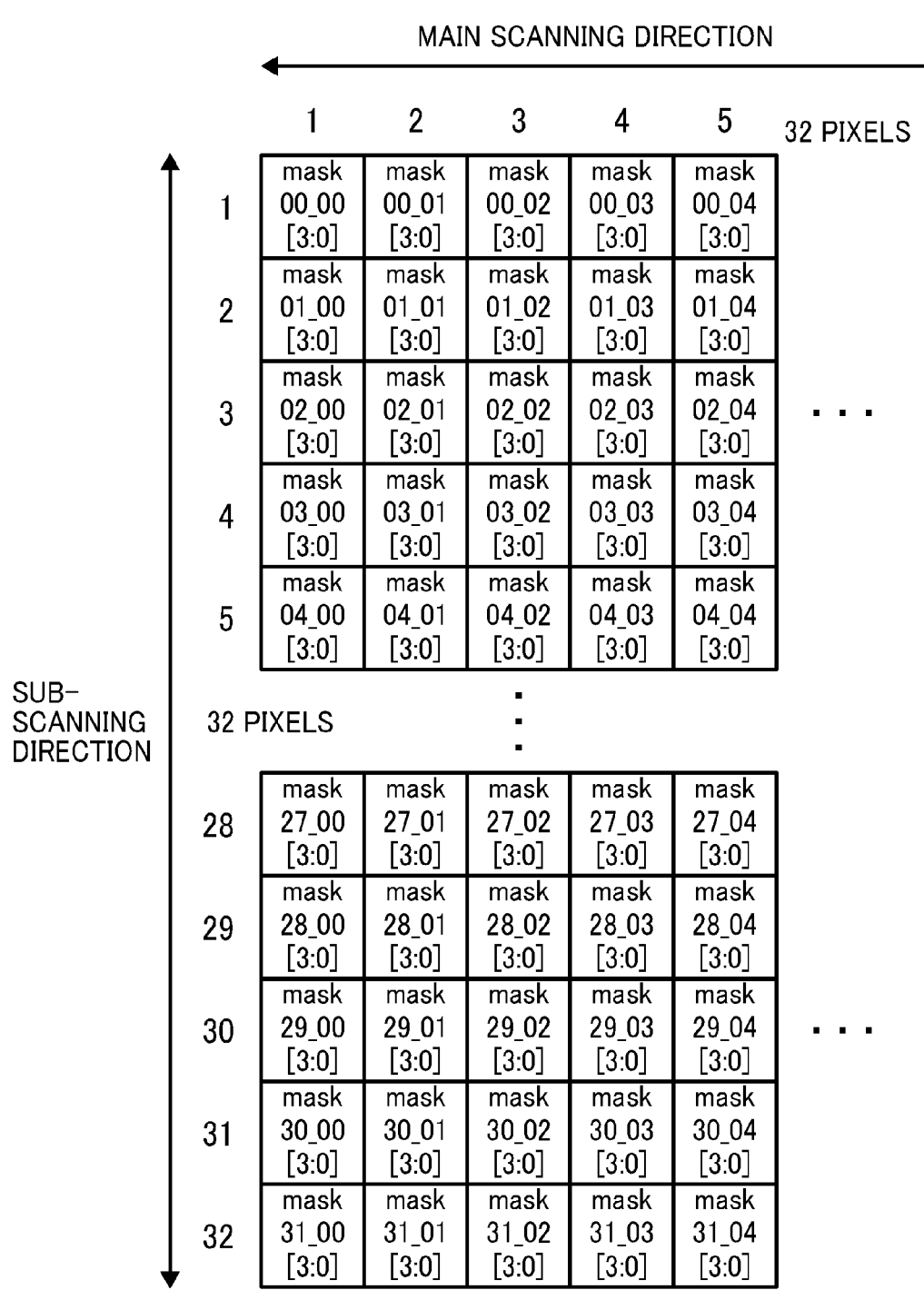

FIGS. 17A and 17B are diagrams illustrating the IBACC pattern generated by the image processing unit 103 of the present embodiment. Based on the IBACC pattern, the electrostatic latent image formed on the photoconductor drum is developed, and the developed image of the IBACC pattern is transferred to an intermediate transfer belt to form the gradation correction pattern image.

The IBACC pattern is generated by the image processing unit 103 of the plotter control unit 1. That is, in the present embodiment, the image processing unit 103 functions as a gradation correction pattern generating circuit (i.e., a gradation correction pattern generator). The IBACC pattern is desired to be formed in a largest possible size to reproduce the dithered image data generated by the controller 7.

The IBACC pattern is further desired to be larger in size than the 4800 dpi image matrix of 16 dots×16 dots for the TC exposure to reproduce the pattern according to the pattern matching of the TC exposure process. In the present embodiment, a matrix of 32 dots×32 dots is formed, and a masking process on the data input to the image processing unit 103 is performed with the period of the matrix. To reproduce the pattern according to the pattern matching of the TC exposure process, it is more desirable to set the size of the IBACC pattern to an integral multiple of the size of the image matrix for the TC exposure.

In the masking process, mask setting is performed, i.e., mask data is individually set for each of 1024 pixels in the matrix of 32 dots×32 dots. The pixels set with the mask data output not the data input to the image processing unit 103 but the mask data.

The density adjustment pattern is used as the data input to the image processing unit 103 to generate the IBACC pattern. The density adjustment pattern originally has a function of masking a small area (e.g., an area of pixels corresponding to 8 dots×8 dots) to adjust the light amount of the light source. Therefore, the density adjustment pattern is formed as a square pattern with an approximate size of 10 mm×10 mm, unlike a color adjustment pattern or a discharge pattern, and thus is compatible with the IBACC pattern.

Whether or not to set the mask data is determined based on an IBACC execution flag. If the IBACC execution flag is ON, all pixels in the matrix are set with the mask data. The mask data is 4-bit configuration data, in which a value ranging from 0 to 15 is set for each of the pixels. Accordingly, the mask data is applicable to a 600 dpi×600 dpi, 4-bit multi-valued image and a 1200 dpi×1200 dpi, ½-bit high-resolution image, for example.

Further, 2 bits of the 4-bit configuration may be set to the image data, and the remaining 2 bits of the 4-bit configuration may be set to the tag data. Therefore, the mask data is also applicable to a high-quality image, such as a 2400 dpi×2400 dpi, 1-bit+tag 1-bit image. The IBACC execution flag is set in each of the parameter control units 100, 200, and 300 of the plotter control units 1, 2, and 3 by the CPU 4. However, the IBACC execution flag is not limited to the above-described configuration, and thus may be configured as a signal transmitted from the plotter control unit 1 to the plotter control units 2 and 3, or may be replaced by a frame gate (FGATE) signal of the density adjustment pattern.

The timing of the TC exposure process on the IBACC pattern by the image processing units 203 and 303 of the present embodiment will be described with reference to FIG. 18.

Figure 18:
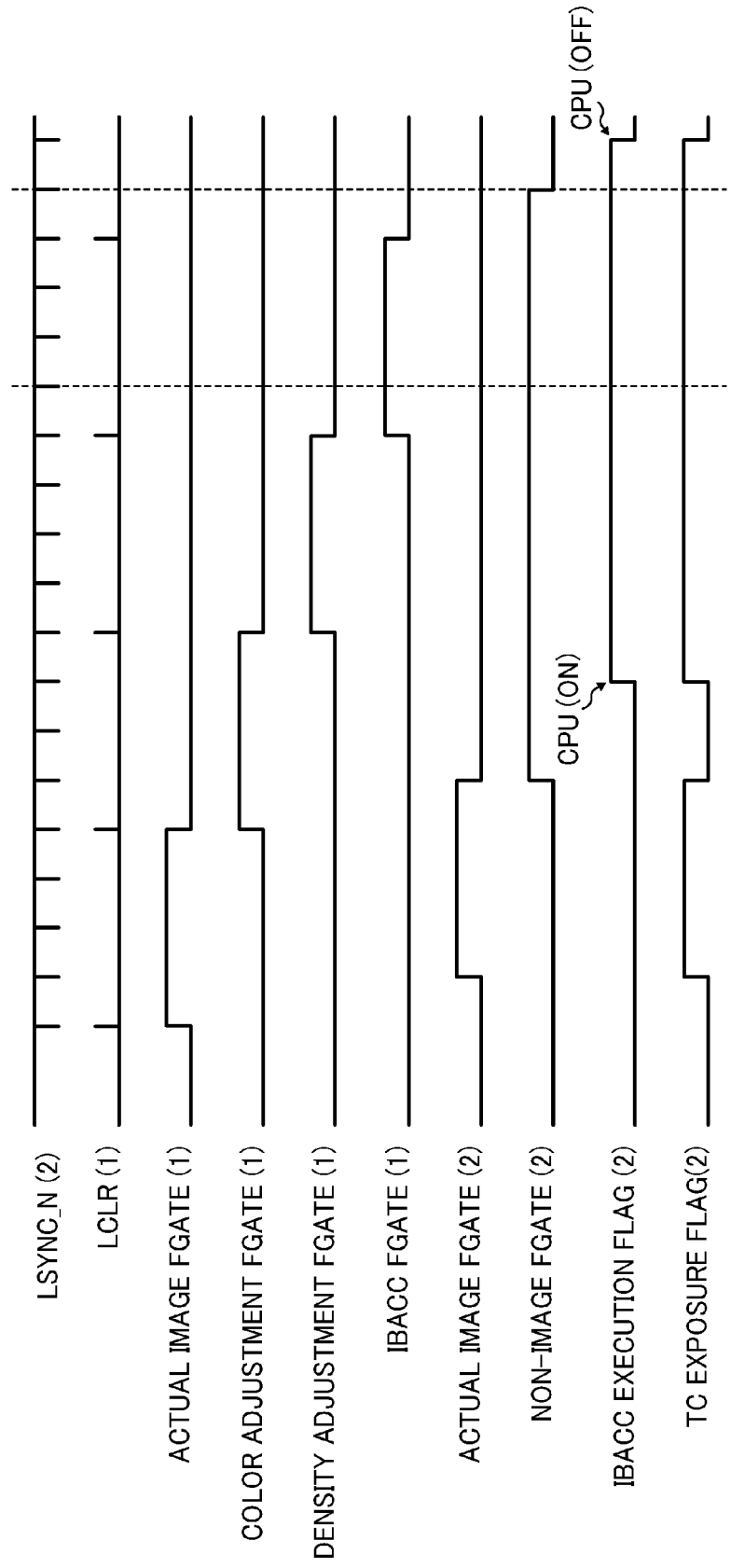
FIG. 18 is a timing chart illustrating timing of the time-concentration exposure process performed on the IBACC pattern by the image processing units of the image processing system according to the embodiment.

FIG. 18 is a timing chart illustrating the timing of the TC exposure process on the IBACC pattern by the image processing units 203 and 303 of the present embodiment. In FIG. 18, (1) indicates a signal generated by the plotter control unit 1, and (2) indicates a signal generated by the plotter control unit 2. In FIG. 18, the plotter control unit 1 sequentially forms the actual image, the color adjustment pattern, the density adjustment pattern, and the IBACC pattern in this order, and transmits the image and patterns to the plotter control units 2 and 3. Each of the plotter control units 2 and 3 generates an actual image FGATE signal and a non-image FGATE signal in accordance with the operation of the plotter control unit 1.

The IBACC execution flag operates based on ON or OFF of the signal of the density adjustment pattern in the plotter control unit 1. The CPU 4 sets the IBACC execution flag in the parameter control units 200 and 300 of the plotter control units 2 and 3 in accordance with the formation of the density adjustment pattern.

In the period demarcated by two broken lines in FIG. 18, each of the plotter control units 2 and 3 is actually forming the IBACC pattern. The ON period of the IBACC execution flag is set to extend beyond the period demarcated by the two broken lines. A TC exposure flag for executing the TC exposure process is the logical sum (OR) of the actual image FGATE signal generated by each of the plotter control units 2 and 3 and the IBACC execution flag. Accordingly, the TC exposure process on the actual image and the TC exposure process on the IBACC pattern are both performed.

Halftone IBACC patterns for the TC exposure process of the present embodiment will be described with reference to FIGS. 19A to 19C.

Figure 19A:
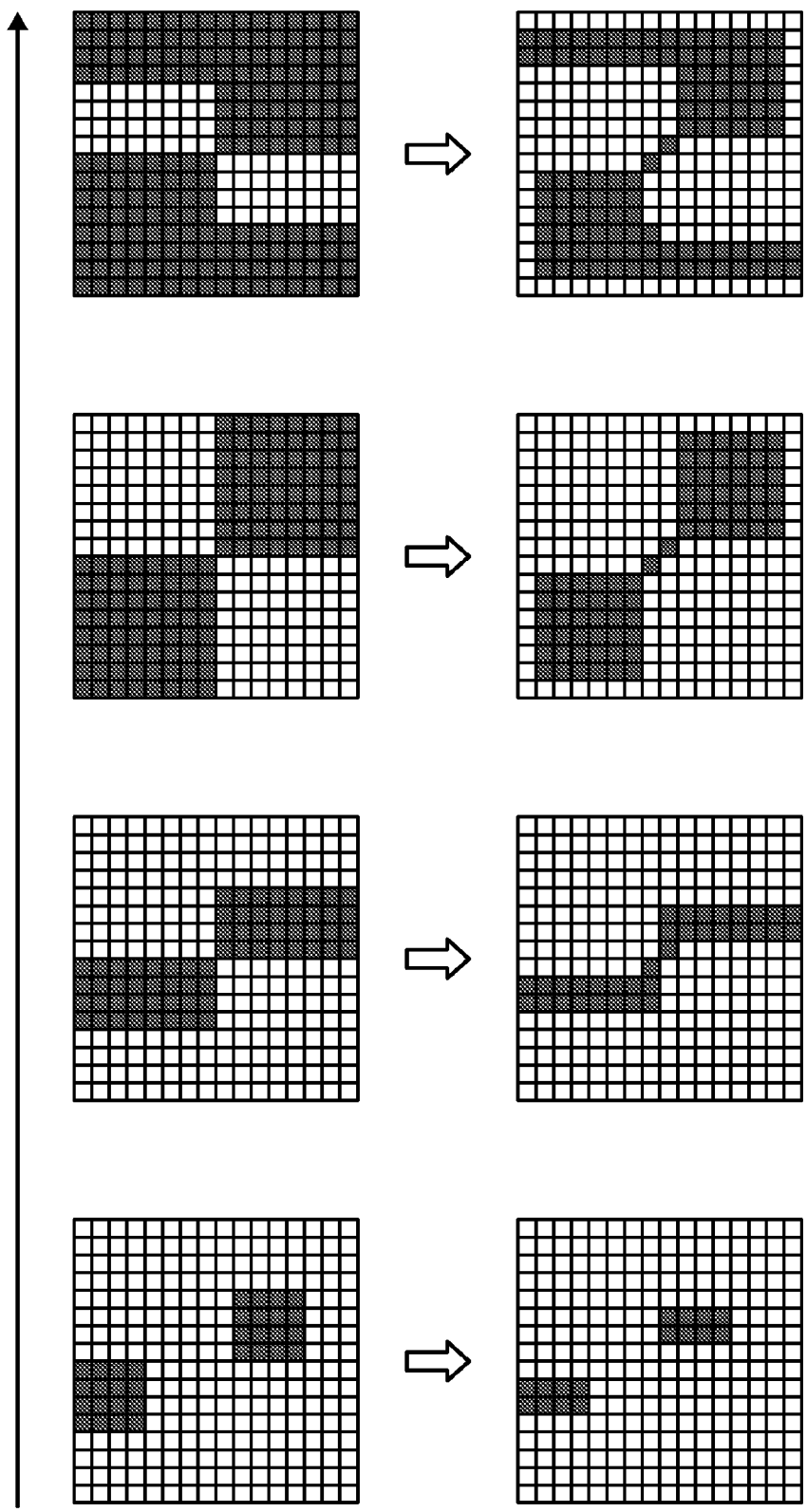
FIGS. 19A to 19C are diagrams for describing halftone IBACC patterns for the time-concentration exposure process according to the embodiment.
Figure 19B:
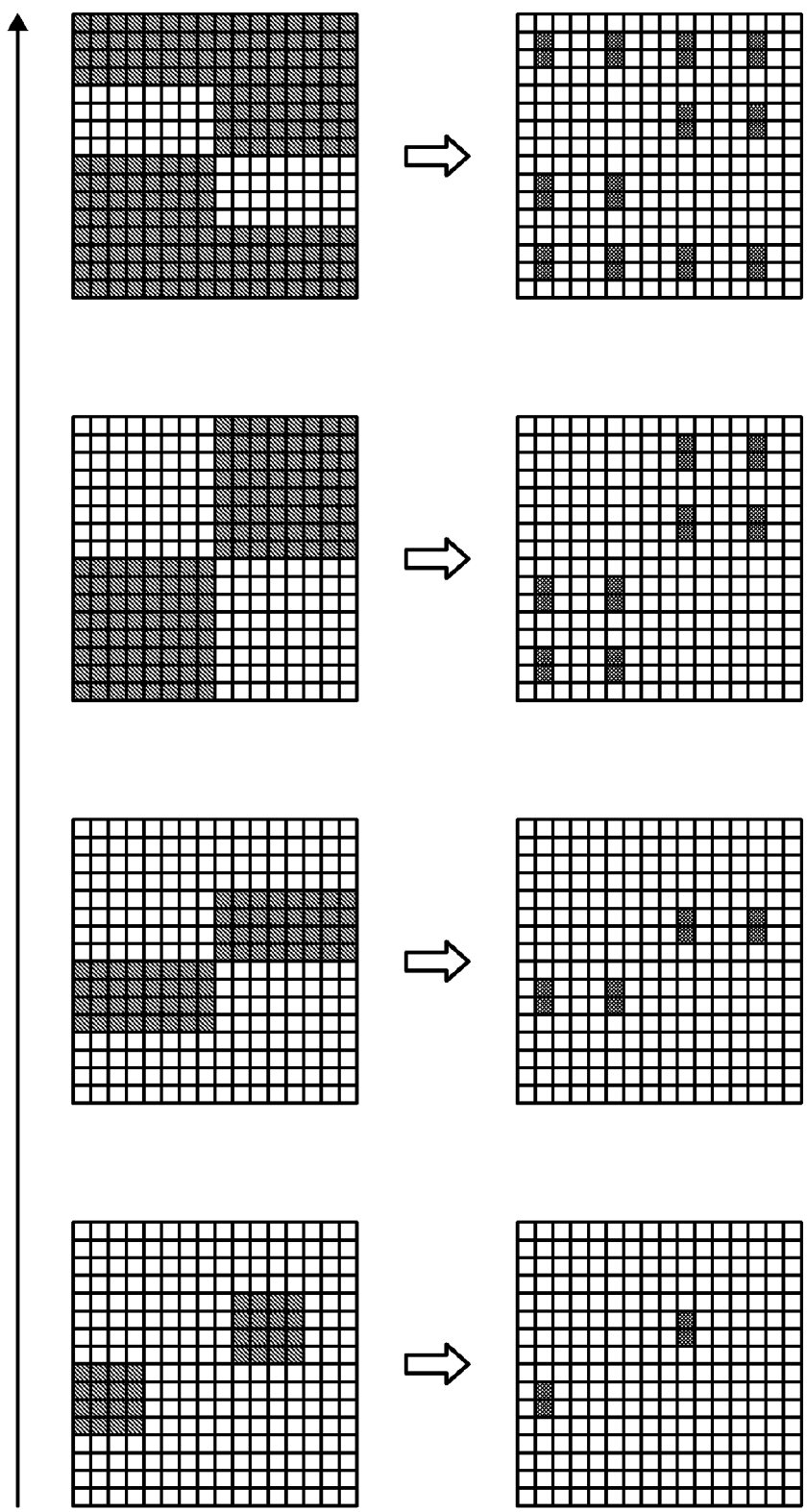
Figure 19C:
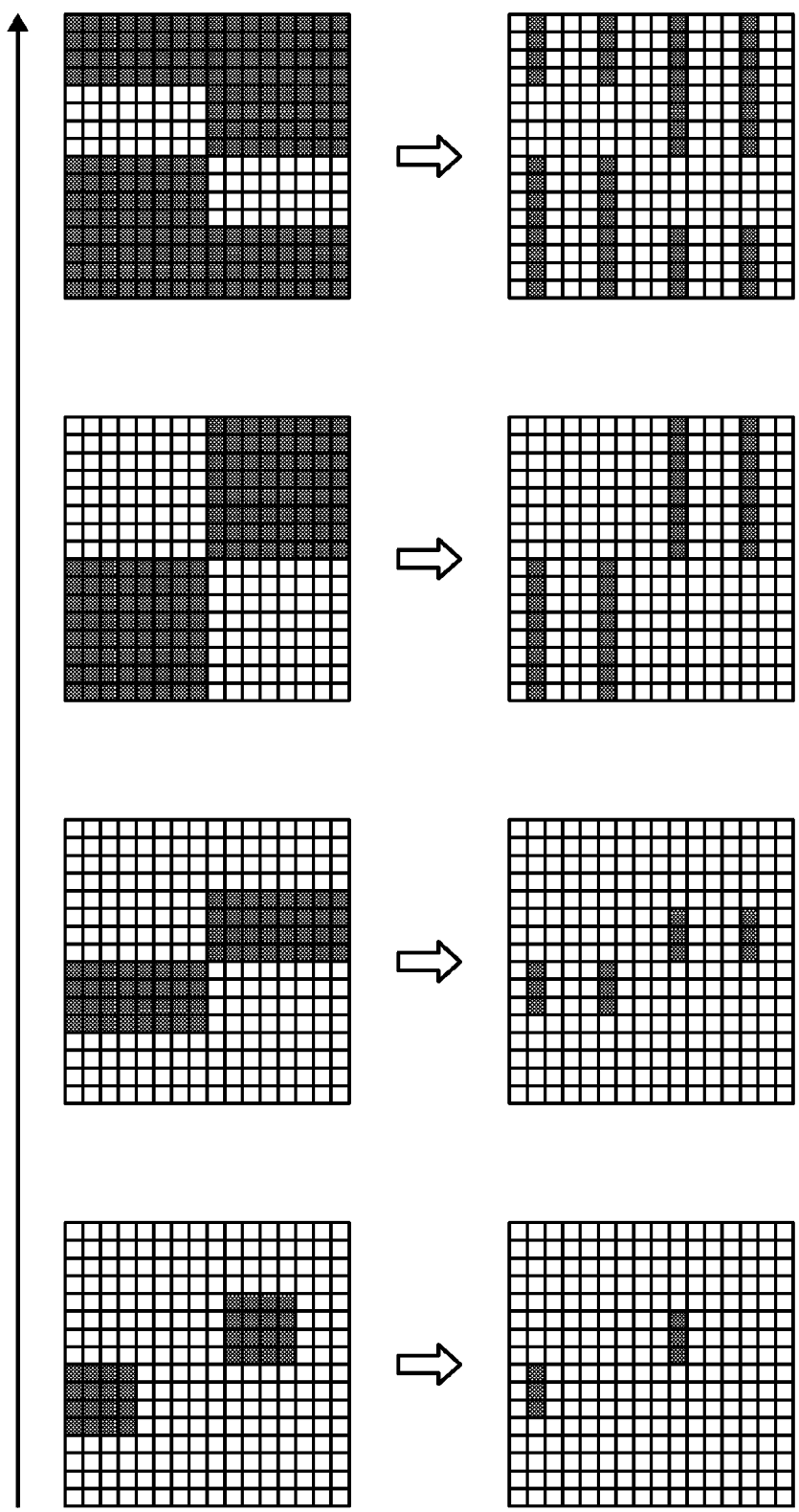

FIGS. 19A to 19C are diagrams for describing halftone IBACC patterns for the TC exposure process of the present embodiment. Specifically, FIGS. 19A to 19C respectively illustrate normal IBACC patterns, halftone IBACC patterns at a halftone level of ⅓, and halftone IBACC patterns at a halftone level of ⅔. In each of FIGS. 19A to 19C, patterns before being subjected to the TC exposure process are illustrated on the upper side, and patterns subjected to the TC exposure process are illustrated on the lower side. A right-pointing arrow in each of FIGS. 19A to 19C indicates the moving direction of the intermediate transfer belt.

To form a normal IBACC pattern, the gradation information of each of the pixels is set in multi-valued data with the mask data, and a low-density image imitating the dithering pattern is formed in the matrix. A plurality of such IBACC patterns are formed on the intermediate transfer belt, and are detected by an optical sensor. These IBACC patterns have the same density level. Based on the detection of densities of the IBACC patterns by the optical sensor, density correction data is generated for each of the IBACC patterns based on one condition.

To obtain the density correction data for the dithering pattern based on the normal IBACC pattern, it is sufficient if the density is expressed at a resolution corresponding to a detection range of the optical sensor (e.g., 0.5 mm to 2 mm), and thus the density is expressed in a simple law. Further, to perform image formation in a short time, a pattern such as a binary zigzag pattern or a binary line pattern simply expressing the density level of the dithering pattern is formed.

In actual dithering patterns, however, different types of dithers are formed in accordance with characters, lines, and photos, and thus plural types of complicated patterns based also on halftone data are formed. Therefore, even if binary data and halftone data are macroscopically equal in density level when the binary data and the halftone data are pixel data, the binary data and the halftone data subjected to the resolution conversion and the TC exposure process form substantially different latent images.

To calculate, with the toner image of the IBACC pattern subjected to the resolution conversion and the TC exposure process, the density correction data similar in quality to the toner image formed with the dithering pattern of the actual image, therefore, the IBACC pattern is formed based also on the halftone data. Then, the resolution conversion and the TC exposure process are performed on the thus-formed IBACC pattern to form a latent image, and a resultant toner image is detected with the optical sensor.

The IBACC pattern is first formed with a matrix having a larger size than the size of the image matrix for the TC exposure (i.e., 4800 dpi, 16 dots×16 dots), more desirably a size corresponding to an integral multiple of the size of the image matrix for the TC exposure. The size of the matrix of the IBACC pattern is 32 dots×32 dots (1200 dpi), which is sufficiently larger than the size of the image matrix for the TC exposure.

Further, to observe a plurality of effects of the TC exposure process, the IBACC pattern covers halftone levels other than a level of 0. Since the input data of the present embodiment is 1200 dpi, 2-bit data, an IBACC pattern at a halftone level of ⅓ and an IBACC pattern at a halftone level of ⅔ are also formed and detected, in addition to the normal IBACC pattern at a halftone level of 3/3. The halftone data is differently converted by the TC exposure, depending on the selected pattern of resolution conversion. When a plurality of resolution conversion patterns are employed, therefore, not only the pixel density but also the plurality of resolution conversion patterns are taken into account in the formation and detection of the IBACC pattern to detect characteristics of the TC exposure process.

The number of shapes (i.e., types) of the IBACC pattern to be formed is equal to the number of functions of the dithering pattern. Although FIGS. 19A to 19C illustrate an example of the zigzag shape used in the present embodiment, there are other types such as character dither, line dither, and photo dither.

In the case of the character dither or the line dither, 1-column lines or 2-column lines are formed at different ratios of black pixels and different densities for each of the pixels. This is for allowing the TC exposure to convert a line into a finer, darker line, to thereby form a sharp latent image.

To perform the TC exposure on the black character or the black line, the image processing units 203 and 303, each of which serves as a TC exposure unit, first recognize that the data to be processed is the black character or the black line based on the tag bit information and the density information. Specifically, the image processing units 203 and 303 recognize that the data is the black character or the black line, if the tag bit is 1 and the pixel density is higher than 0. Data of the tag bit of 1 is transferred from the plotter control unit 1 to the plotter control units 2 and 3 as a part of pixel bits of the IBACC pattern or as an expansion bit. To reduce the amount of data to be transferred, the tag bit of 1 may be forcefully attached to the data, instead of being transferred, at the time of receipt of the data by the plotter control units 2 and 3.

In the case of the white character or the white line, 1-column, solid white lines or 2-column, solid white lines are formed at different ratios of black pixels and different densities for each of the pixels. This is for preventing the TC exposure from converting the white character or the white line into a thicker white line, making the line unclear.

To perform the TC exposure on the white character or the white line, the image processing units 203 and 303 (i.e., the TC exposure units) first recognize that the data to be processed is the white character or the white line based on the tag bit information and the density information. Specifically, the image processing units 203 and 303 recognize that the data is the white character or the white line, if the tag bit is 0 and the pixel density is 0. Data of the tag bit of 0 is transferred from the plotter control unit 1 to the plotter control units 2 and 3 as a part of pixel bits of the IBACC pattern or as an expansion bit. To reduce the amount of data to be transferred, the tag bit of 0 may be forcefully attached to the data, instead of being transferred, at the time of receipt of the data by the plotter control units 2 and 3.

In the case of the photo dither, patterns such as squares, rectangles, rhombi, or diagonal lines are formed at different ratios of black pixels and different densities for each of the pixels. This is for allowing the TC exposure to form a latent image with an emphasized edge portion.

To perform the TC exposure on the photo dither, the image processing units 203 and 303 (i.e., the IC exposure units) first recognize that the data to be processed is a dither based on the tag bit information and the pattern matching. Specifically, the image processing units 203 and 303 recognize that the data is a dither (i.e., edge) if the tag bit is 0 and the data matches the pattern in the pattern matching. Data of the tag bit of 0 is transferred from the plotter control unit 1 to the plotter control units 2 and 3 as a part of pixel bits of the IBACC pattern or as an expansion bit. To reduce the amount of data to be transferred, the tag bit of 0 may be forcefully attached to the data, instead of being transferred, at the time of receipt of the data by the plotter control units 2 and 3.

With the above-described configuration, the image processing system 1100 of the present embodiment forms the toner image based on the halftone IBACC pattern subjected to the IC exposure process. The image processing system 1100 of the present embodiment detects the thus-formed toner image with the optical sensor, and generates the gradation correction data for the dithering process based on the detection. The image processing system 1100 then feeds the generated gradation correction data back to the controller 7, which calculates the density correction data for the dithering process, and performs the dithering correction process based on the calculated density correction data for the dithering process. In the present embodiment, therefore, the controller 7 functions as a correction value calculating circuit. Accordingly, the image processing system 1100 of the present embodiment obtains accurate gradation correction data similar in quality to the actual image.

As described above, in the image processing system 1100 of the present embodiment, the image processing device 1000 performs the TC exposure on the dithering pattern of the actual image. When the image processing device 1000 performs the image density correction using the gradation correction pattern (i.e., the IBACC pattern), the image processing device 1000 performs the IC exposure process after generating the gradation correction pattern including the halftone data. Accordingly, the image processing system 1100 forms and detects the latent image similar in quality to the dithering pattern of the actual image, and thereby calculates accurate density correction data for the dithering process.

That is, the image processing system 1100 of the present embodiment performs the IC exposure process after generating the gradation correction pattern including the halftone data, and forms the gradation correction patterns according to the size and variations of the pattern matching of the IC exposure process. Accordingly, the image processing system 1100 of the present embodiment forms the toner image similar in quality to the dithering pattern of the actual image.

The image processing system 1100 of the present embodiment performs an image processing method that includes performing a dithering process on image data to generate dithered image data, setting, in multi-valued data, gradation information of each of pixels of the generated dithered image data, generating a gradation correction pattern imitating the dithered image data, performing pattern matching on the generated gradation correction pattern, and correcting the generated gradation correction pattern in accordance with a result of the pattern matching.

The image processing method may further include generating, based on the corrected gradation correction pattern, light emission data for controlling light emission of a light emission circuit that emits light to form an electrostatic latent image on an image bearer, calculating a correction value for the dithering process based on a result of detection of a gradation correction pattern image resulting from development of the electrostatic latent image formed on the image bearer based on the generated light emission data, and correcting the dithering process based on the calculated correction value.

The image processing method may further include performing resolution conversion on the generated gradation correction pattern. The performing the pattern matching may further performing the pattern matching on the gradation correction pattern subjected to the resolution conversion. Further, the correcting the generated gradation correction pattern may include correcting the gradation correction pattern subjected to the resolution conversion in accordance with the result of the pattern matching.

In the image processing method, the performing the pattern matching may include performing the pattern matching centering on a target pixel of the generated gradation correction pattern, and converting the target pixel into a strong exposure pixel if a preset pattern is detected in the pattern matching.

In the image processing method, the correcting the generated gradation correction pattern may include converting, if a pixel diagonal to the target pixel is detected as the preset pattern in the pattern matching, each of the target pixel and the pixel diagonal to the target pixel into the strong exposure pixel.

In the image processing method, the correcting the generated gradation correction pattern may include converting, if an edge portion in a main scanning direction is detected as the preset pattern in the pattern matching, the target pixel into the strong exposure pixel and converting a pixel adjacent to the target pixel into an off pixel.

In the image processing method, the correcting the generated gradation correction pattern may include converting, if an edge portion in a sub-scanning direction is detected as the preset pattern in the pattern matching, the target pixel into the strong exposure pixel and converting a pixel adjacent to the target pixel into an off pixel.

In the image processing method, the correcting the generated gradation correction pattern may include performing mask setting on each of pixels of a density adjustment pattern to generate the gradation correction pattern.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image processing device comprising:
a dithering circuit to perform a dithering process on image data to generate dithered image data;
a gradation correction pattern generating circuit to set, in multi-valued data, gradation information of each of pixels of the generated dithered image data, and generate a gradation correction pattern imitating the generated dithered image data;
a gradation correction pattern correcting circuit to perform pattern matching on the generated gradation correction pattern, and correct the generated gradation correction pattern in accordance with a result of the pattern matching;
a light emission data generating circuit to generate, based on the corrected gradation correction pattern, light emission data for controlling light emission of a light emission circuit that emits light to form an electrostatic latent image on an image bearer; and
a correction value calculating circuit to calculate a density correction value for the dithering process based on a result of detection of a gradation correction pattern image resulting from development of the electrostatic latent image formed on the image bearer based on the generated light emission data,
wherein the dithering circuit is further configured to perform a dithering correction process of correcting the dithering process based on the calculated density correction value.

2. The image processing device of claim 1, further comprising:
a resolution converting circuit to perform resolution conversion on the generated gradation correction pattern,
wherein the gradation correction pattern correcting circuit is configured to perform the pattern matching on the gradation correction pattern subjected to the resolution conversion, and correct the gradation correction pattern subjected to the resolution conversion in accordance with the result of the pattern matching.

3. The image processing device of claim 1, wherein the gradation correction pattern correcting circuit is configured to perform the pattern matching centering on a target pixel of the generated gradation correction pattern, and in response to a preset pattern being detected in the pattern matching, convert the target pixel into a strong exposure pixel, the strong exposure pixel being a pixel to be exposed with higher light emission energy than light emission energy set for other pixels.

4. The image processing device of claim 3, wherein in response to a pixel diagonal to the target pixel being detected as the preset pattern in the pattern matching, the gradation correction pattern correcting circuit is configured to convert each of the target pixel and the pixel diagonal to the target pixel into the strong exposure pixel.

5. The image processing device of claim 3, wherein in response to an edge portion in a main scanning direction being detected as the preset pattern in the pattern matching, the gradation correction pattern correcting circuit is configured to perform one of conversion of the target pixel into the strong exposure pixel and conversion of a pixel adjacent to the target pixel into an off pixel having a value of zero.

6. The image processing device of claim 3, wherein in response to an edge portion in a sub-scanning direction being detected as the preset pattern in the pattern matching, the gradation correction pattern correcting circuit is configured to perform one of conversion of the target pixel into the strong exposure pixel and conversion of a pixel adjacent to the target pixel into an off pixel having a value of zero.

7. The image processing device of claim 1, wherein the gradation correction pattern generating circuit is configured to perform mask setting on each of pixels of a density adjustment pattern to generate the gradation correction pattern.

8. An image processing system comprising:
a dithering processor to perform a dithering process on image data to generate dithered image data;
a gradation correction pattern generator to set, in multi-valued data, gradation information of each of pixels of the generated dithered image data, and generate a gradation correction pattern imitating the generated dithered image data;
a gradation correction pattern corrector to perform pattern matching on the generated gradation correction pattern, and correct the generated gradation correction pattern in accordance with a result of the pattern matching;
a light emission data generator to generate, based on the corrected gradation correction pattern, light emission data for controlling light emission of a light emission circuit that emits light to form an electrostatic latent image on an image bearer; and
a correction value calculator to calculate a density correction value for the dithering process based on a result of detection of a gradation correction pattern image resulting from development of the electrostatic latent image formed on the image bearer based on the generated light emission data,
wherein the dithering processor is further configured to perform a dithering correction process of correcting the dithering process based on the calculated density correction value.

9. The image processing system of claim 8, further comprising:
a resolution converter to perform resolution conversion on the generated gradation correction pattern, wherein the gradation correction pattern corrector is configured to perform the pattern matching on the gradation correction pattern subjected to the resolution conversion, and correct the gradation correction pattern subjected to the resolution conversion in accordance with the result of the pattern matching.

10. The image processing system of claim 8, wherein the gradation correction pattern corrector is configured to:
perform the pattern matching centering on a target pixel of the generated gradation correction pattern; and
convert the target pixel into a strong exposure pixel, in response to a preset pattern being detected in the pattern matching, the strong exposure pixel being a pixel to be exposed with higher light emission energy than light emission energy set for other pixels.

11. The image processing system of claim 10, wherein the gradation correction pattern corrector is further configured to:
convert each of the target pixel and the pixel diagonal to the target pixel into the strong exposure pixel, in response to a pixel diagonal to the target pixel being detected as the preset pattern in the pattern matching;
perform one of conversion of the target pixel into the strong exposure pixel and conversion of a pixel adjacent to the target pixel into an off pixel having a value of zero, in response to an edge portion in a main scanning direction being detected as the preset pattern in the pattern matching; and
perform one of conversion of the target pixel into the strong exposure pixel and conversion of a pixel adjacent to the target pixel into an off pixel having a value of zero, in response to an edge portion in a sub-scanning direction being detected as the preset pattern in the pattern matching.

12. The image processing system of claim 8, wherein the gradation correction pattern generator is configured to perform mask setting on each of pixels of a density adjustment pattern to generate the gradation correction pattern.

13. An image processing method comprising:
performing a dithering process on image data to generate dithered image data;
setting, in multi-valued data, gradation information of each of pixels of the generated dithered image data, and generating a gradation correction pattern imitating the generated dithered image data;
performing pattern matching on the generated gradation correction pattern, and correcting the generated gradation correction pattern in accordance with a result of the pattern matching;
generating, based on the corrected gradation correction pattern, light emission data for controlling light emission of a light emission circuit that emits light to form an electrostatic latent image on an image bearer;
calculating a density correction value for the dithering process based on a result of detection of a gradation correction pattern image resulting from development of the electrostatic latent image formed on the image bearer based on the generated light emission data; and
performing a dithering correction process of correcting the dithering process based on the calculated density correction value.

14. The image processing method of claim 13, further comprising:
performing resolution conversion on the generated gradation correction pattern, and
performing the pattern matching on the gradation correction pattern subjected to the resolution conversion, and correcting the gradation correction pattern subjected to the resolution conversion in accordance with the result of the pattern matching.

15. The image processing method of claim 13, further comprising:
performing the pattern matching centering on a target pixel of the generated gradation correction pattern, and
converting the target pixel into a strong exposure pixel, in response to a preset pattern being detected in the pattern matching, the strong exposure pixel being a pixel to be exposed with higher light emission energy than light emission energy set for other pixels.

16. The image processing method of claim 15, further comprising:
converting each of the target pixel and the pixel diagonal to the target pixel into the strong exposure pixel, in response to a pixel diagonal to the target pixel being detected as the preset pattern in the pattern matching;
performing one of conversion of the target pixel into the strong exposure pixel and conversion of a pixel adjacent to the target pixel into an off pixel having a value of zero, in response to an edge portion in a main scanning direction being detected as the preset pattern in the pattern matching; and
performing one of conversion of the target pixel into the strong exposure pixel and conversion of a pixel adjacent to the target pixel into an off pixel having a value of zero, in response to an edge portion in a sub-scanning direction being detected as the preset pattern in the pattern matching.

17. The image processing method of claim 13, further comprising performing mask setting on each of pixels of a density adjustment pattern to generate the gradation correction pattern.

* * * * *